(12) United States Patent
Kumazawa et al.

(10) Patent No.: US 7,499,396 B2
(45) Date of Patent: Mar. 3, 2009

(54) ROUTER SELECTING METHOD AND ROUTER APPARATUS

(75) Inventors: Masayuki Kumazawa, Yokohama (JP);
Taisuke Matsumoto, Yokohama (JP);
Shinkichi Ikeda, Yokohama (JP);
Hirokazu Kobayashi, Inagi (JP);
Makoto Funabiki, Yokohama (JP);
Toyoki Kawahara, Chofu (JP)

(73) Assignee: Panasonic Corporation, Osaka (JP)

(*) Notice: Subject to any disclaimer, the term of this patent is extended or adjusted under 35 U.S.C. 154(b) by 559 days.

(21) Appl. No.: 10/554,717

(22) PCT Filed: Oct. 1, 2004

(86) PCT No.: PCT/JP2004/014891

§ 371 (c)(1),
(2), (4) Date: Oct. 28, 2005

(87) PCT Pub. No.: WO2005/034440

PCT Pub. Date: Apr. 14, 2005

(65) Prior Publication Data

US 2006/0203828 A1 Sep. 14, 2006

(30) Foreign Application Priority Data

Oct. 2, 2003 (JP) ............................. 2003-344151
Sep. 27, 2004 (JP) ............................. 2004-279083

(51) Int. Cl.
*H04L 12/26* (2006.01)
(52) U.S. Cl. .................... 370/230; 370/390; 370/401; 709/242; 709/243
(58) Field of Classification Search ............ 370/219, 370/236, 468, 395.52, 401; 709/238, 242, 709/240, 223
See application file for complete search history.

(56) References Cited

U.S. PATENT DOCUMENTS 5,473,599 A * 12/1995 Li et al. .................... 370/219

(Continued)

FOREIGN PATENT DOCUMENTS

JP 09-018518 1/1997

(Continued)

OTHER PUBLICATIONS

International Search Report for application No. PCT/JP2004/014891 dated Dec. 28, 2004.

(Continued)

*Primary Examiner*—Hassan Kizou
*Assistant Examiner*—Jeffrey M Rutkowski
(74) *Attorney, Agent, or Firm*—RatnerPrestia

(57) ABSTRACT

A router includes a multicast packet transmitting unit that multicasts the identifier of the router periodically, a relay determining unit that determines whether a received data packet should be relayed to a router in another segment, an order determining unit that determines, on the basis of information included in multicast packets from the other routers, the router to which the data packet shall be transferred, and a packet relaying unit that, when the data packet is not relayed, notifies the transmission source which transmitted the packet as to the router selected by the order determining unit to be the relay destination and then transfers the data packet to the selected router. A router suitable for relaying the packet is thus selected. Since switching of the relay router may be performed by following the router redirection message, it is unnecessary to add a new function to a terminal.

22 Claims, 28 Drawing Sheets

U.S. PATENT DOCUMENTS

| | | | |
|---|---|---|---|
| 6,397,260 B1 * | 5/2002 | Wils et al. | 709/238 |
| 6,556,547 B1 * | 4/2003 | Srikanth et al. | 370/317 |
| 6,931,452 B1 * | 8/2005 | Lamberton et al. | 709/242 |
| 7,035,217 B1 * | 4/2006 | Vicisano et al. | 370/236 |
| 2002/0101860 A1 * | 8/2002 | Thornton et al. | 370/352 |
| 2002/0186653 A1 * | 12/2002 | Jensen | 370/219 |
| 2003/0037165 A1 * | 2/2003 | Shinomiya | 709/238 |
| 2003/0200333 A1 * | 10/2003 | Espieu et al. | 709/240 |
| 2005/0025179 A1 * | 2/2005 | McLaggan et al. | 370/468 |

FOREIGN PATENT DOCUMENTS

| | | |
|---|---|---|
| JP | 2002-198988 A | 7/2002 |
| JP | 2003-023444 | 1/2003 |
| WO | WO 01/35585 A1 | 5/2001 |

OTHER PUBLICATIONS

S. Knight, et al., "Virtual Router Redundancy Protocol," The Internet Society, 1998.

* cited by examiner

| ENTRY | LAST ARRIVAL TIME |
|---|---|
| fe80::11 | - |
| | |
| | |

Fig. 5A

| ENTRY | LAST ARRIVAL TIME |
|---|---|
| fe80::11 | - |
| fe80::13 | 12:00:01 |
| | |

Fig. 5B

| ENTRY | LAST ARRIVAL TIME |
|---|---|
| fe80::11 | - |
| fe80::12 | 12:03:04 |
| fe80::13 | 12:00:01 |

| ENTRY | TRANSMISSION SOURCE | DESTINATION | STATE |
|---|---|---|---|
| 1 | 3::14 | 4::16 | REDIRECTED |

Fig. 14B

| ENTRY | TRANSMISSION SOURCE | DESTINATION | STATE |
|---|---|---|---|
| 1 | 3::14 | 4::16 | REDIRECTED |
| 2 | 3::15 | 4::17 | REDIRECTED |

Fig. 14C

| ENTRY | TRANSMISSION SOURCE | DESTINATION | STATE |
|---|---|---|---|
| 1 | 3::14 | 4::16 | ACTIVE |
| 2 | 3::15 | 4::17 | REDIRECTED |

Fig. 22

| ENTRY | MAC ADDRESS | LAST ARRIVAL TIME |
|---|---|---|
| fe80::11 | 00:00:00:00:00:11 | - |
| fe80::12 | 00:00:00:00:00:12 | 12:03:04 |
| fe80::13 | 00:00:00:00:00:13 | 12:00:01 |

…

ROUTER SELECTING METHOD AND ROUTER APPARATUS

This Application is a U.S. National Phase Application of PCT International Application PCT/JP2004/014891.

TECHNICAL FIELD

The present invention relates to a router in a local area network (LAN) in which two or more router apparatuses having a function of connecting to an external network are present, and, in particular, to a router selecting method and a router apparatus for determining a router suited to a specific packet flow.

BACKGROUND ART

Conventionally, as the router selecting method, there is the method described in "Virtual Router Redundancy Protocol" (S. Knight, et al.).

In the method described in the literature, a set of routers called virtual routers share one IP address, one router serving as a master router operates as the default router of the LAN, and the other routers are put on standby as backup routers. Priorities are set for the respective routers.

If the master router can no longer operate as the default router of the LAN for some reason, a router having the highest priority among the backup routers starts operating as the master router.

It is possible to improve communication efficiency of the LAN as a whole if the priorities are set in order from the router having the highest packet transfer capability.

However, in this method, there is only one router that can always be used among the virtual routers. It is thus impossible to select an appropriate router for a particular case.

Therefore, it is impossible to select and use a router having an optimum access interface according to the demands of an application. For example, when there is a router with an access interface to a wireless LAN (a wireless LAN router) and a router having an access interface to a cellular network (a cellular router), using the wireless LAN router to perform an FTP requiring a broadband and using the cellular router to operate an IP telephone requiring reliability is impossible.

As a method of solving this problem, for example, there is a method described in JP-T-2003-514442 (the term "JP-T" as used herein means a published Japanese translation of a PCT patent application). FIG. 28 is a diagram showing a method described in this published Japanese translation of the PCT patent application. In FIG. 28, in access selection 151, the set access capability given in the information 153 for each router with an interface to each access network concerning that access, and the access capability required by a user which is set in the user preferences 512 of a terminal, are compared, and the terminal determines the optimum router.

However, in the conventional constitution, since the terminal selects a router, there is a problem in that not only routers but also terminals need to have a special function. In general, a communication function of the terminals is low compared with a communication function of the routers. Thus, the addition of this function is unrealistic in terms of cost and apparatus size. In addition, since the terminals select routers individually, there is also a problem in that, if plural terminals select one router, load concentrates on that router and efficient communication cannot be performed.

DISCLOSURE OF THE INVENTION

It is an object of the invention to solve these problems with the conventional art and provide a router selecting method and a router apparatus that realize efficient communication of the whole network while complying with the demands and other specifics of a particular application.

A router selecting method according to the invention is a router selecting method for a local area network including plural routers that perform relay with an external network. The router selecting method includes: a step in which each router in one segment periodically multicasts multicast packets including its own identifier; a router selecting step in which a router is selected to receive data packets and forward them among the other plural routers in the same segment on the basis of information included in the multicast packets received from the other routers in the same segment; a step in which it is determined according to conditions determined in advance whether the router which has received the data packet from a node or a router in that segment shall send the packet to another segment; a forwarding step in which, if the router which has received the data packet does not relay the data packet to another segment, the router performs redirection, instructing the device sending the data packet to send it to a router selected ahead of time as the next relay destination, and transferring the data packet to that selected router or discarding the data packet; and a step in which the node sending the packet and which has received the redirect command transmits the data packet and subsequent data packets to the specified router. The router selecting method is characterized in that the transfer step is repeated until the data packet is received by a router that can relay the data packet.

Thus, in the end a router suitable for relaying the packet is selected. Since the selection of a router is performed merely by redirection among routers, it is possible to make it unnecessary to add a new function to a terminal.

A router selecting method according to the invention is a router selecting method for a local area network including plural routers that perform relay with an external network. The router selecting method includes: a step in which each router in one segment periodically multicasts a multicast packet including the identifier of that router; a step in which a router is selected to transfer data packets among the plural routers in that segment on the basis of information included in the multicast packet received from the other routers in the segment; a step in which the selected router determines in accordance with conditions determined in advance whether it shall relay the data packet received from a node or a router in the same segment to another segment; a step in which, if the router decides not to relay the received data packet to another segment, the router transfers the data packet to a selected router; a step in which, if the router relays the received data packet to another segment, if the data packet was not directly received from the node which originally sent the packet but rather is a forwarded packet forwarded from another router, the router transmits relay report information which indicates that the router is capable of relaying the forwarded packet, to the router which transferred the packet; and a step in which, when the router which transferred the packet receives the relay report information, the router judges whether it is the original router that has transferred the data packet that is the object of the relay report information, and, if so, the router transmits to the node which is to send the data packet a redirect command which specifies a router that is capable of relaying the data packet, while if not so, the router transfers the relay report information to the router that transferred the data packet which is the object of the relay report information.

Thus, in the end a router suitable for relaying the packet is selected. Since the selection of a router is performed only through the redirection of routers, it is possible to make it unnecessary to add a new function to a terminal. Moreover, since a redirect packet is transmitted only after a router capable of relaying the packet is identified, it is possible to restrain increase in network loads due to an increase of redirect packets. Since a terminal has to change a path only once, it is possible to reduce processing loads on the terminal.

The router selecting method is characterized in that information described in the multicast packet in the router selecting method according to the invention comprises identifiers of each of the routers. This makes it unnecessary to set the order of the routers manually. It is possible to determine an order without redundancy according to, for example, the ascending order or descending order of identifiers.

The router selecting method according to the invention is characterized in that, in determining the order of selecting routers in the router selecting step, only information included in the multicast packet is used.

This makes it possible, if the data packet is transferred to a router to which the router selecting method according to the invention cannot be applied, to prevent a state in which the data packet is not transferred to routers of lower rank in the above order at all and loads concentrate on the router to which the invention is not applicable.

The router selecting method according to the invention is characterized in that the order of determining routers to be selected is updated upon addition or deletion of routers in the same segment. This makes it possible to select from among routers including those which have been added and select routers excluding those which have been deleted.

The router selecting method according to the invention is characterized in that the multicast packet is periodically transmitted from each of the routers and, when a multicast packet is received from a router from which a multicast packet had not been previously received, the router is considered to be added to the segment and is added to the router selecting order. This makes it unnecessary to update the order manually even when a router is added.

The router selecting method according to the invention is characterized in that, when a multicast packet from a specific router is not transmitted for a fixed time, the specific router is considered to be deleted from the LAN and is deleted from the router selecting order. This makes it unnecessary to update the order manually even at the time of deletion of a router.

A router apparatus according to the invention includes: a multicast packet transmitting unit that periodically multicasts a multicast packet including the identifier of the router apparatus; a relay determining unit that determines in accordance with conditions determined in advance whether a data packet which has been received from a node or a router in the same segment and which is to be relayed to another segment shall be relayed to a router in another segment; an order determining unit that determines a router to transfer the data packet, from among the routers in the same segment on the basis of information included in the multicast packet received from the other routers in the segment; and a packet relaying unit that in response to a notice from the relay determining unit which indicates that it is impossible to relay the data packet, transfers the data packet to the next router selected by the order determining unit, and informs the device sending the data packet of the router which is the relay destination of the data packet or discards the data packet.

Consequently, the router can determine whether the router should relay a packet based on nothing more than the information held by the router. The router does not need to communicate the information it holds to other terminals and routers. Thus, it is possible to set conditions for relay freely for each router. Thus, in the end a router suitable for relaying the packet is selected. Since switching of the relay router is performed merely be following the router redirection message, it is unnecessary to add a new function to a terminal.

A router apparatus according to the invention includes: a multicast packet transmitting unit that periodically multicasts a multicast packet including the identifier of the router apparatus; a relay determining unit that determines in accordance with conditions determined in advance whether a data packet which is received from a node or a router in the same segment and which is to be relayed to another segment shall be relayed to a router in another segment; an order determining unit that determines the router to which the data packet shall be transferred from among the routers in the same segment on the basis of information included in the multicast packets received from the other routers in the same segment; a packet relaying unit that transfers the data packet to the next router selected by the order determining unit in response to a notice from the relay determining unit which indicates that it is impossible to relay the data packet, and, when the device sending the data packet is a node, stores at least a packet identifier, which specifies the data packet, and a device identifier, which specifies the device sending the packet, in a header information storage unit so that the two identifiers are linked; a relay report constructing unit that generates a relay report message, which reports that the router apparatus will relay a packet according to a request from the packet relaying unit; and a relay report transferring unit that transfers a relay report message received from another router to a router at a transfer source of the data packet. The router apparatus is further characterized in that when the data packet which is the object of the relay report message received by a router from another router is identical with the data packet stored in the header information storage unit of that router, the packet relaying unit notifies the transmission source node which transmitted the packet indicated by the device identifier, of the router which will relay the data packet.

In this way, the router can determine whether the router shall relay a packet based on nothing but the information held by the router. The router does not need to communicate the information held by the router to other terminals and routers. Thus, it is possible to set conditions for relay freely for each of the routers. Thus, in the end a router suitable for relaying the packet is selected. Since switching of the relay router is performed merely by following a router redirection message, it is unnecessary to add a new function to a terminal. Moreover, since a redirect packet is transmitted only when a router capable of relaying the packet is determined, it is possible to restrain increase in network load due to an increase of redirect packets. Since a terminal has to change its transmitting path only once, it is possible to reduce the processing load on the terminal.

The order determining unit of the router apparatus according to the invention determines a selection order for routers using identifiers included in the multicast packets. This makes it unnecessary to set the selection order for the routers manually. It is possible to set a selection order without redundancy by determining the order according to, for example, the ascending order/descending order of identifiers.

The order determining unit of the router apparatus according to the invention determines a selection order for routers using flag information, included in the multicast packet, as well. This makes it possible to prevent a router which is not dealt with by the present invention from being included in an order of routers to be selected. This makes it possible to prevent concentration of load because after a data packet is transferred to the router according to the invention, the data packet is not transferred anymore.

The order determining unit of the router apparatus according to the invention has an order updating unit that, when a multicast packet is received from a router not included in the selection order, adds that router to the selection order and, when a multicast packet is not received from a router included in the selection order for a defined time, deletes the router from the selection order. This makes it unnecessary to update the order manually even when a router is to be added or deleted.

The conditions for determining whether it is possible to relay the data packet to a router in another segment set in the relay determining unit of the router apparatus are: type of the data packet, congestion state in the router, transmission capability, the number of times the relay determining unit has determined that the data packet cannot be relayed, or communication cost, or a combination of some of these conditions. In this way, it is determined whether it is possible to relay the data packet to the router by evaluating the state of the line to which the router accesses. Thus, in the end a router suitable for relaying the packet is selected. When a router suitable for relaying the packet is not found and the packet is transferred among routers many times, it is possible to prevent an increase in network loads by, for example, performing relay after relaxing conditions to relay the packet.

As described above, according to the invention, it is possible to realize router selection suited to various purposes through control of only routers.

Information on access capability of each of the routers only has to be held by that router itself and is not required to be communicated to other routers and terminals. Thus, a message for exchanging access capability information is unnecessary, traffic is reduced, and the degree of freedom of the access capability information itself is improved.

BRIEF DESCRIPTION OF THE DRAWINGS

FIGS. 5A to 5C are diagrams showing forms of an order table held by the router in the first embodiment of the invention.

FIGS. 14A to 14C are diagrams showing forms of a flow table held by a router 11 in the first to the third embodiments of the invention.

FIG. 22 is a diagram showing a form of an order table held by the router in the third embodiment of the invention.

BEST MODE FOR CARRYING OUT THE INVENTION

Embodiments of the invention will be hereinafter explained with reference to the drawings.

First Embodiment

Figure 1:
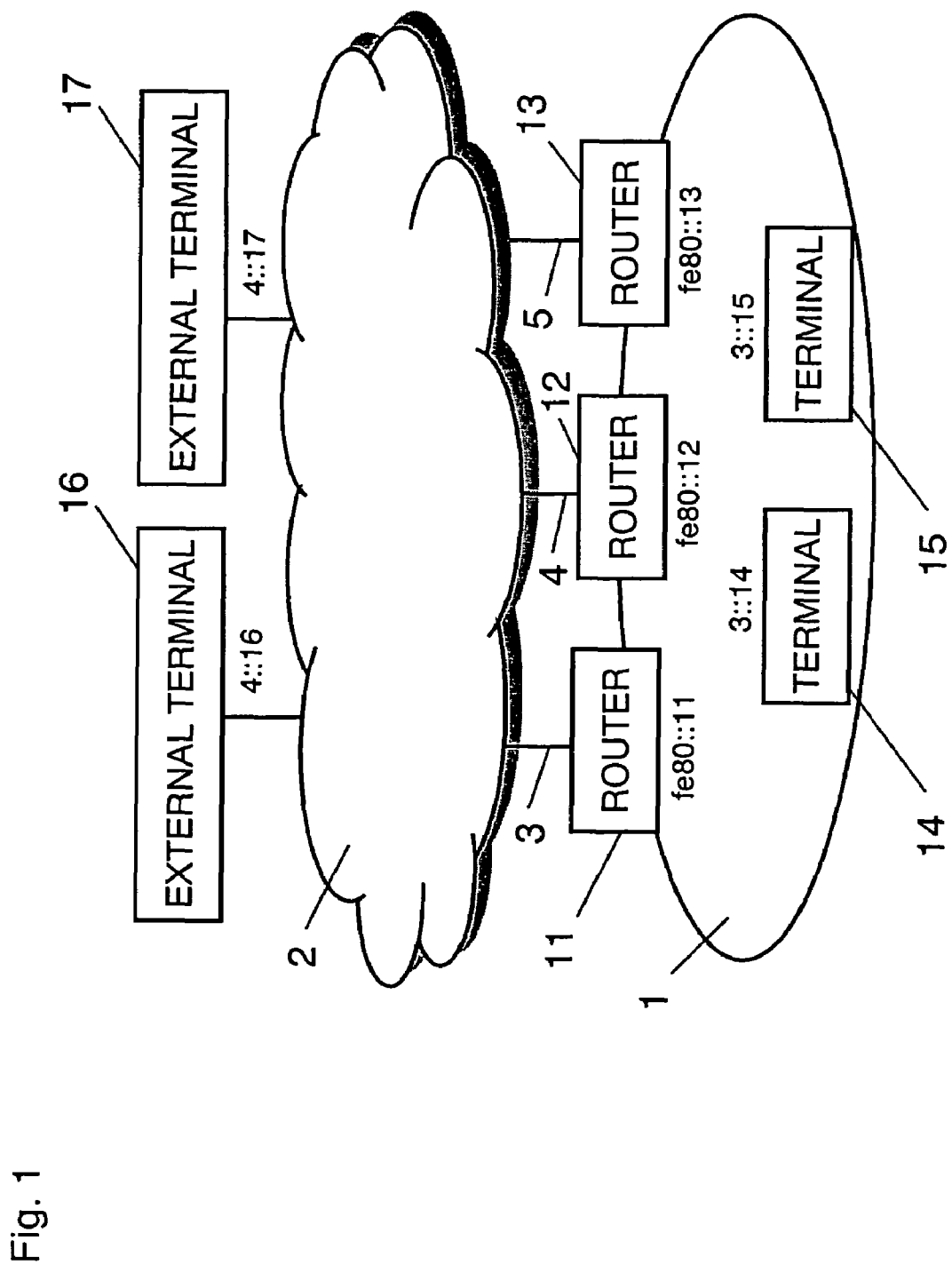
FIG. 1 is a diagram of a communication system in a first embodiment and a third embodiment of the invention.

FIG. 1 is a diagram showing a constitution of a network in an embodiment of the invention.

In FIG. 1, routers 11, 12, and 13 relay communication between a LAN 1 and an external network 2 and include access interfaces with a third-generation cellular phone (band: 364 kbps, packet charge) 3, a PHS (band: 64 kbps, flat rate) 4, and a wireless LAN (band: 5 Mbps, flat rate) 5. Terminals 14 and 15 belong to the LAN 1. External terminals 16 and 17 are connected to the external network 2. The routers 11 to 13 include LAN interfaces as well as the access interfaces and are connected to the terminals 14 and 15 having the same LAN interface.

Figure 2:
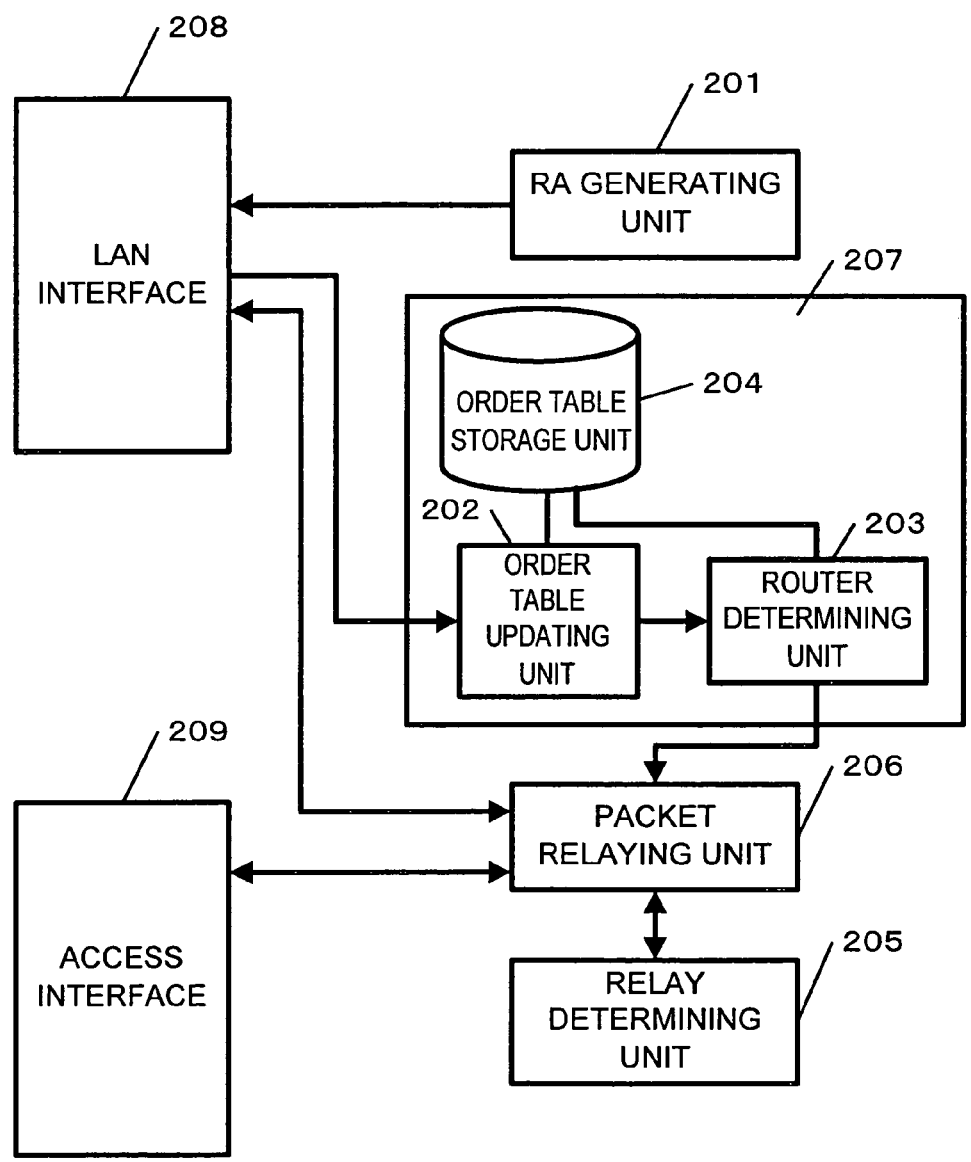
FIG. 2 is a diagram of a router in the first embodiment of the invention.

FIG. 2 is a block diagram showing a constitution of the routers 11, 12, and 13 in this embodiment. In FIG. 2, a LAN interface 208 performs physical layer processing and data link layer processing for communication with the terminals 14 and 15 and other routers connected to the LAN 1. An access interface 209 performs physical layer processing and data link layer processing for communication with an external network.

An RA generating unit 201 generates router advertisement packets (hereinafter referred to as RA packets) including identifiers for identifying the routers. The RA generating unit 201 and the LAN interface 208 constitute a multicast packet transmitting unit.

An order table updating unit 202 performs update such as registration and deletion of a router in an order table in which the order for selecting routers in one segment to relay a data packet received from a terminal in that segment to another segment, is described. An updated order table is stored in an order table storage unit 204 and read out at the time of the next update. A router determining unit 203 determines a relay router from the order table. The order table updating unit 202, the router determining unit 203, and the order table storage unit 204 constitute an order determining unit 207.

A relay determining unit 205 determines whether a data packet received via the LAN interface 208 should be relayed to a router in another segment by judging conditions such as the congestion state and transmission capability of the line to be accessed, set in advance. The relay determining unit 205 also has a flow table for managing a group of packets, which have the same transmission source address and the same transmission destination address, as a flow.

The packet relaying unit 206 has a routing table, and instructs change of the router which relays a data packet to the final destination or relays the data packet to the relay router in accordance with the routing table, in accordance with the result of inquiry to the relay determining unit 205.

Operations of the respective functional blocks will be hereinafter explained.

Figure 6:
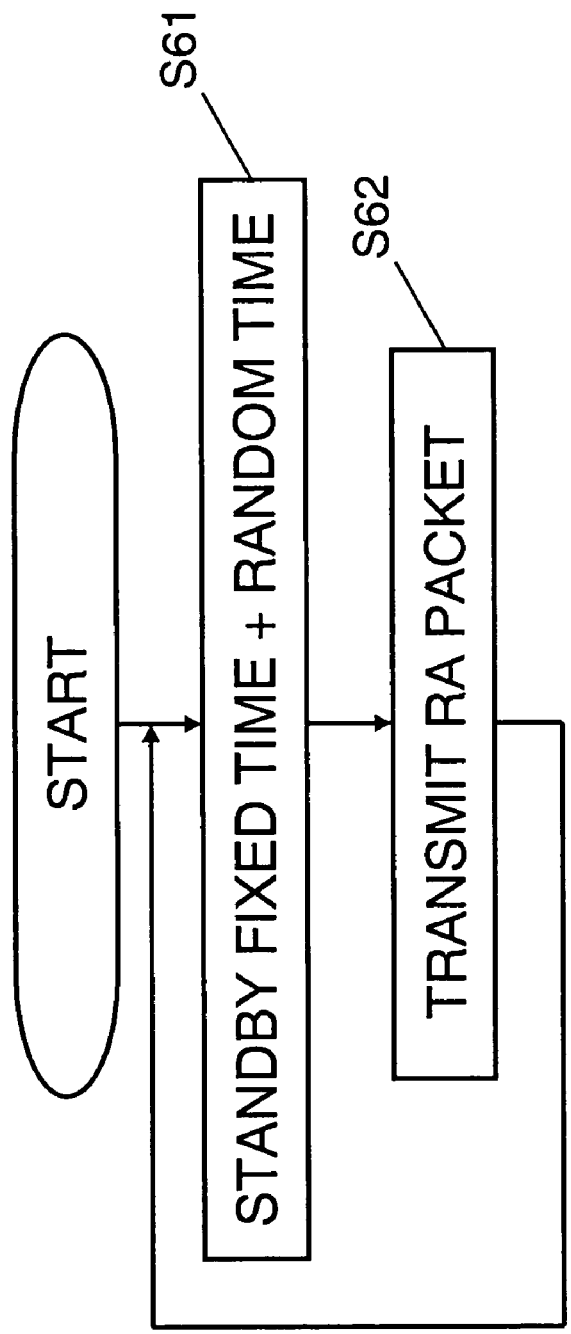
FIG. 6 is a flowchart of transmission processing for a router advertisement packet of a router in the first to the third embodiments of the invention.

FIG. 6 is a flowchart for explaining operation of the RA generating unit 201.

Figure 12:
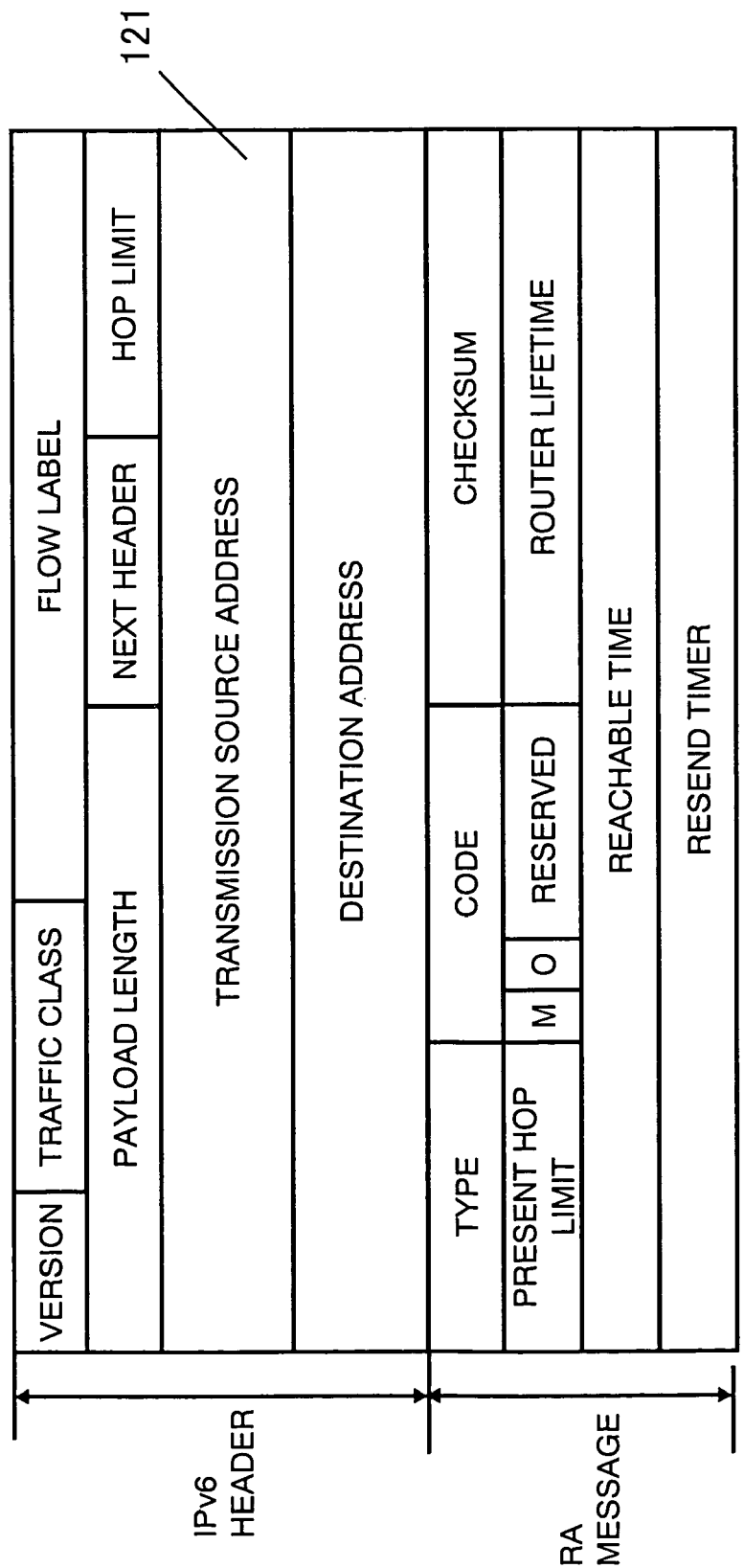
FIG. 12 is a format chart of the router advertisement packet in the first embodiment and the third embodiment of the invention.

The RA generating unit 201 is put on standby for a fixed time plus a randomly chosen time in order to prevent the times of RA packet transmission among routers (step S61) from overlapping, and multicasts an RA packet via the LAN interface 208 (step S62). The fixed time is usually set to five seconds. A format of the RA packet is shown in FIG. 12. The address of the router that transmits the RA packet is set in the transmission source address field (121).

Figure 7:
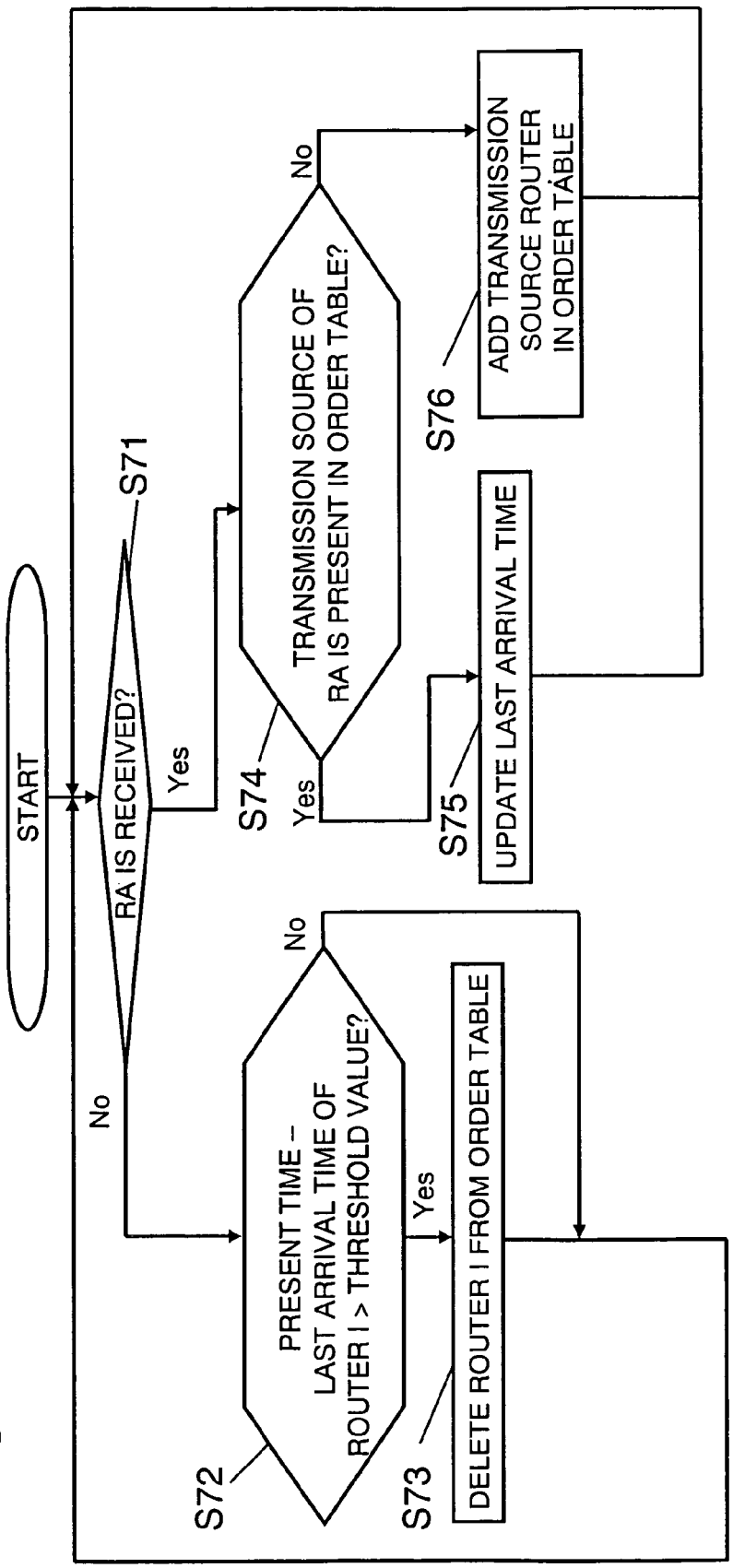
FIG. 7 is a flowchart of order table maintenance processing for a router in the first embodiment and the third embodiment of the invention.

FIG. 7 is a flowchart for explaining the operation of the order determining unit 207.

The order table updating unit 202 checks whether an RA packet is received from another router via the LAN interface 208 (step S71). When an RA packet is not received from another router, the order table updating unit 202 checks whether there is an already registered router from which an RA packet has not arrived for more than a fixed time (step S72). When there is such a router, the order table updating unit 202 deletes that router from the order table (step S73) and returns to step S71. When there is no applicable router, the order table updating unit 202 also returns to step S71.

On the other hand, when an RA packet is received, the order table updating unit 202 refers to the transmission source address of the RA packet received and checks whether the transmission source address is already registered in the order table (step S74). When the transmission source address is registered in the order table, the order table updating unit 202 updates the last arrival time entry for that router (step S75). When the transmission source address is not registered in the order table, the order table updating unit 202 adds the transmission source address to the order table (step S76). The addition in the order table is performed with reference to the transmission source address field (121), and transmission source addresses are registered in an ascending order of host addresses of routers. Note that an instruction for registering transmission source addresses in the ascending order of the addresses is set in advance in the respective routers.

Figure 4:
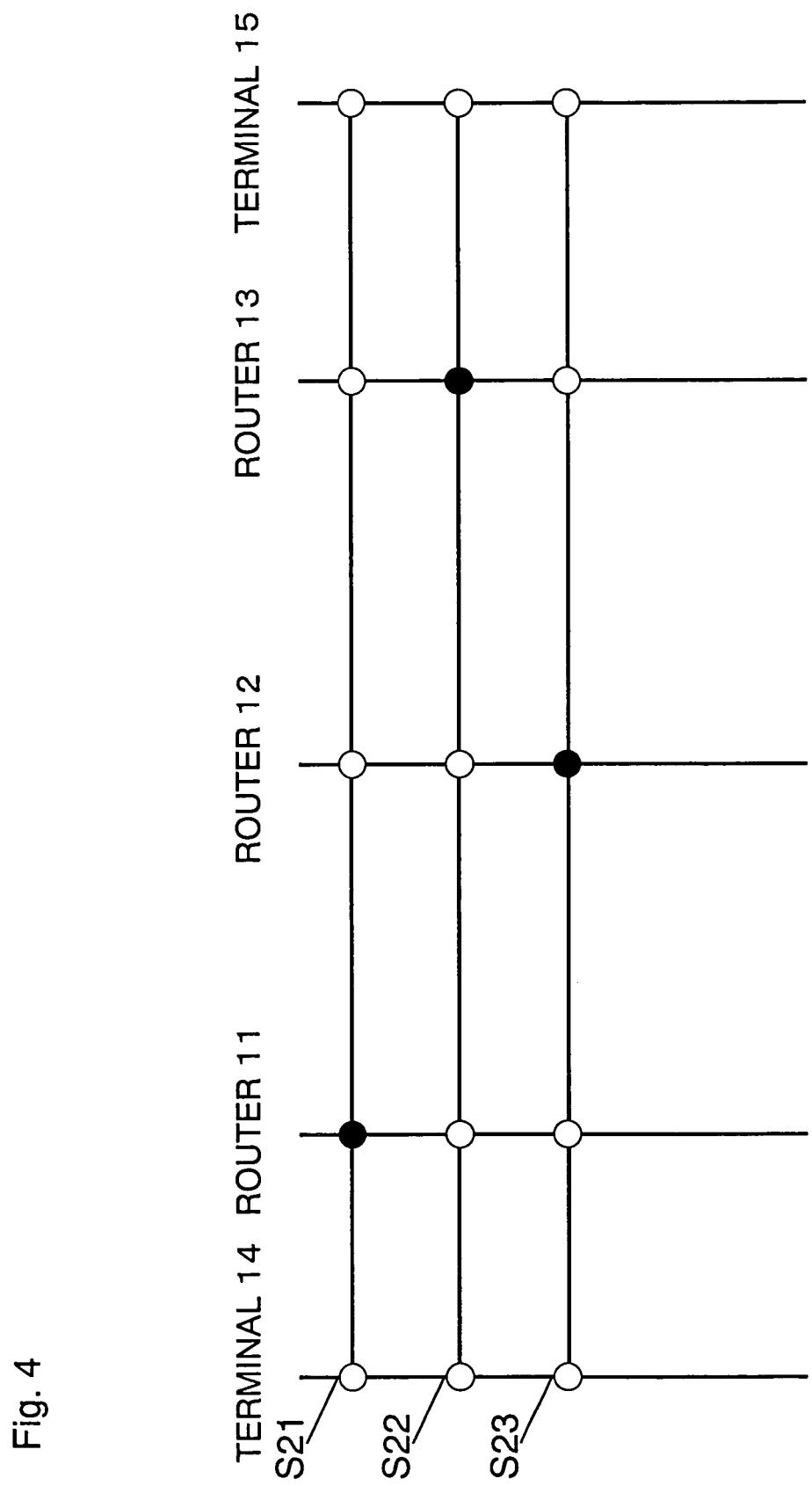
FIG. 4 is a diagram showing a transmission sequence of a router advertisement packet in the first and the third embodiment of the invention.

Transition of the order table in the router 11 in the case in which the routers 11, 12, and 13 multicast an RA packet in an order shown in FIG. 4 is shown in FIGS. 5A to 5C. Note that, in FIG. 4, black circles indicate transmission sources of a router advertisement packet and white circles indicate receivers of the router advertisement packet.

When the router 11 is not receiving an RA packet from another router (step S21), the router 11 holds an order table including only an address of the router 11 as shown in FIG. 5A.

When the router 11 receives an RA packet from the router 13 (step S22), the router 11 adds the address of the router 13 in the order table as shown in FIG. 5B. At this point, the reception time of the RA packet is entered in a last arrival time space.

When the router 11 receives an RA packet from the router 12 lastly (step S23), the router 11 adds the address of the router 12 in the order table as shown in FIG. 5C. The address table is arranged in the ascending order of address numbers. Thus, the address of the router 12 is added between the router 11 and the router 13. Note that it is assumed that after the last entry comes the first entry again in the order table.

In this way, the order table is created and held for each of the routers. Since rules for creating order tables are common to all the routers, contents of order tables held by all the routers are the same except for the last arrival times (141) of RA packets. Note that, although the address table is created in the ascending order of addresses, the address table may be created in the descending order of addresses or may be created in accordance with other rules.

The RA generating unit 201 and the order determining unit 207 cause the routers 11 to 13 to periodically multicast an RA packet, which is generated by the RA generating unit 201, via the LAN interface 208, and so communicate identification information of the routers. In addition, the order determining unit 207 updates the order table based on identification information of another router whenever this information is received via the LAN interface.

Figure 9:
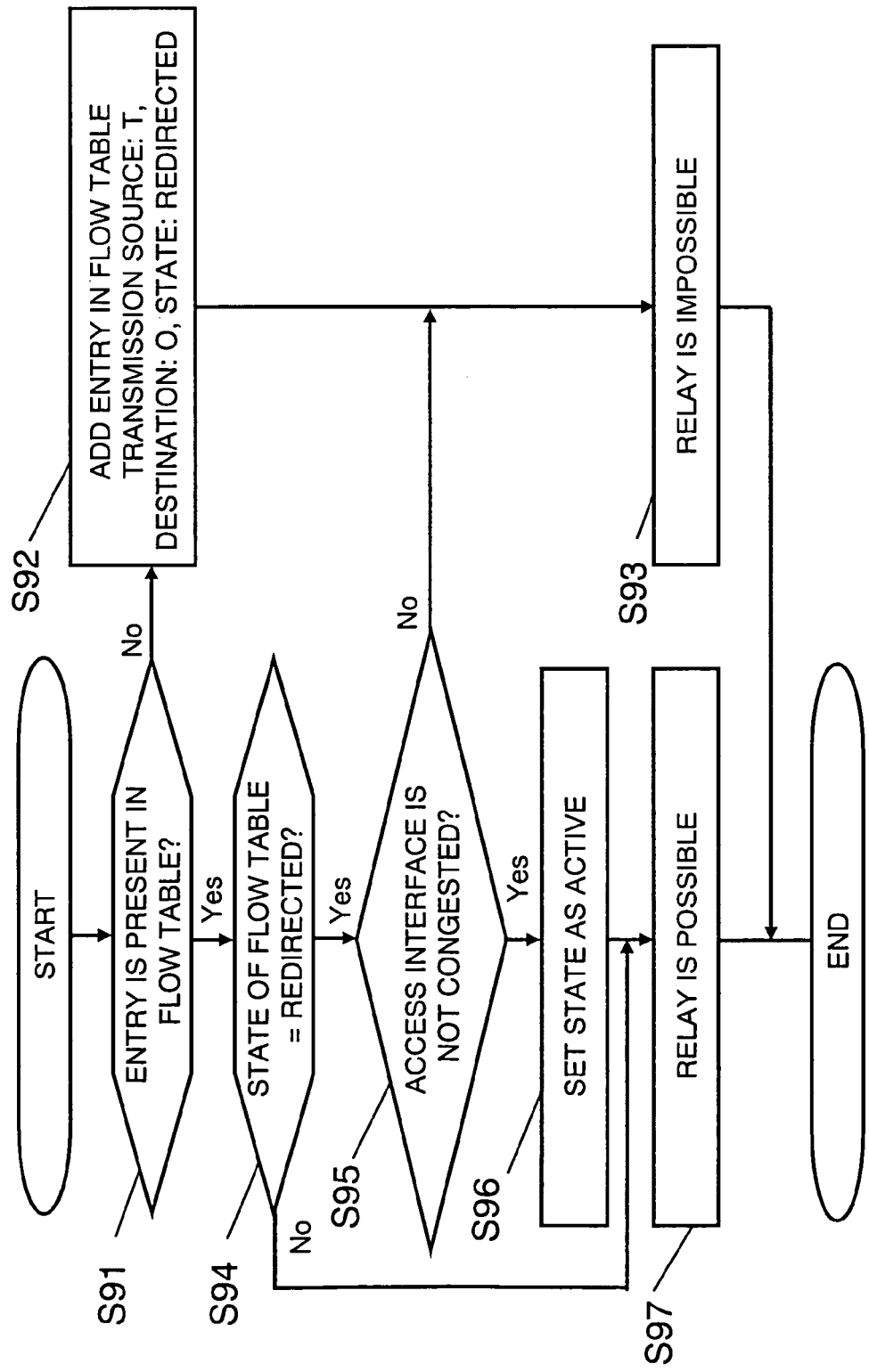
FIG. 9 is a flowchart of relay judgment processing for the router in the first to the third embodiments of the invention.
Figure 10:
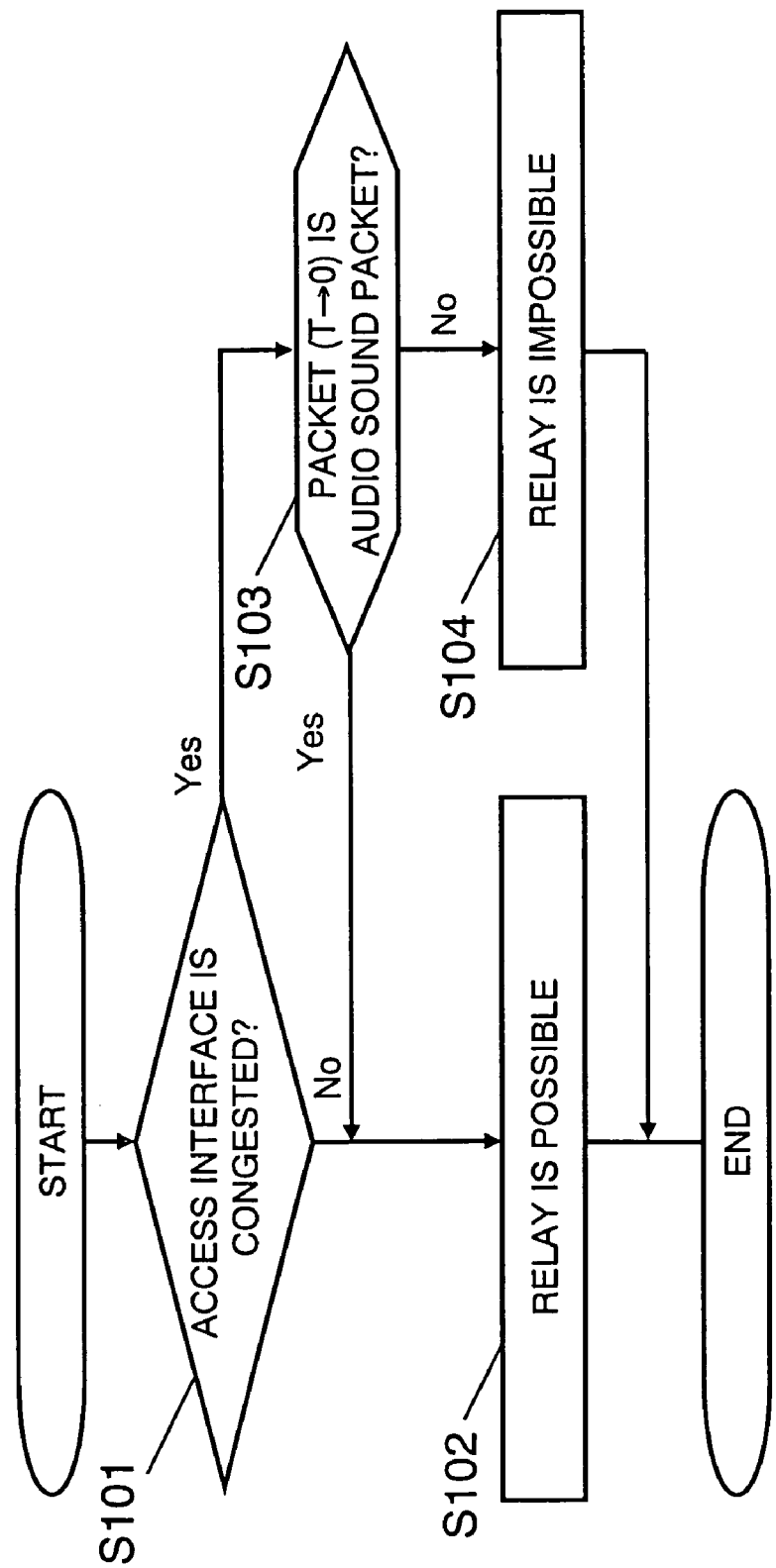
FIG. 10 is a flowchart of relay judgment processing for the router in the first to the third embodiments of the invention.
Figure 11:
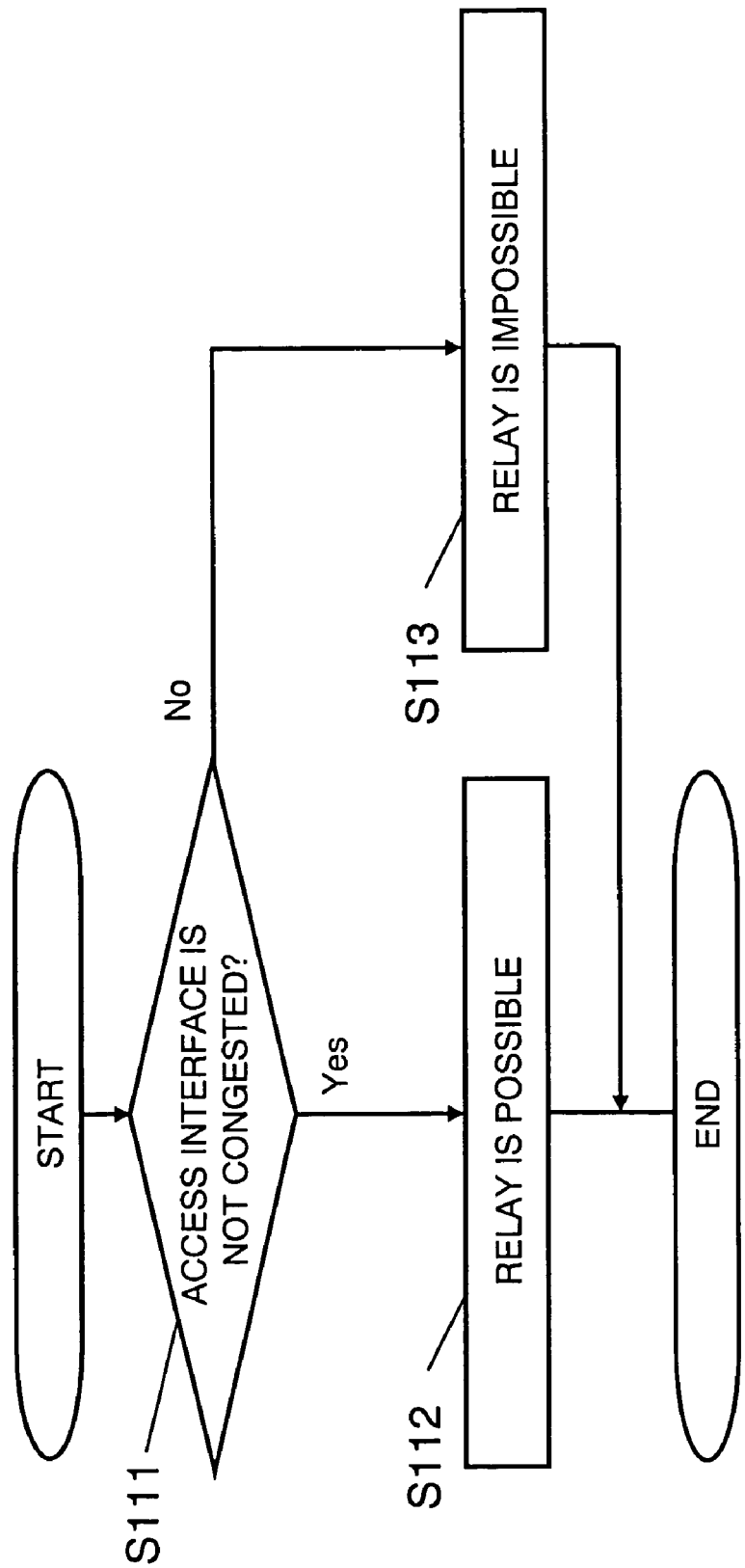
FIG. 11 is a flowchart of relay judgment processing for the router in the first to the third embodiments of the invention.

FIGS. 9 to 11 are flowcharts for explaining operations of the relay determining units 205 of the routers 11 to 13, respectively. FIG. 14A shows the state of a router entered in the order table.

First, an operation of the relay determining unit 205 of the router 11 will be explained using FIG. 9. The router 11 includes an access interface for third-generation cellular communication and is set to always pass a first transfer request to another router in the same segment in order to restrain frequency of use.

First, the relay determining unit 205 starts in response to an inquiry from the packet relaying unit 206, refers to the transmission source address and transmission destination address of the arrived packet, and checks whether there is an entry in a flow table (step S91). Note that it is assumed that a series of packets having the same values at one or more fields of the packet header comprise one flow. In other words, a group of packets having the same transmission source address and the same transmission destination address are defined as a flow. This means a group of packets constituting communication between specific hosts. When there is no entry concerning the flow of the arrived packet, the relay determining unit 205 sets a transmission source address and a destination address in the flow table and, then, adds the entry "Redirected" in the state column (step S92), judging that it is impossible to relay the packet (step S93).

On the other hand, when there is an entry in the flow table, the relay determining unit 205 checks whether the state given in the flow table is Redirected (state S94) and, if the state is not Redirected, the relay determining unit 205 judges that relay is possible (step S97). When a state of the flow table is Redirected, the relay determining unit 205 checks whether the access interface is congested (step S95). If the access interface is not congested, the relay determining unit 205 sets the state as Active (step S96), judges that relay is possible (step S97), and sends a response to the packet relaying unit 206. When the access interface is congested, the relay determining unit 205 judges that relay is impossible (step S93) and sends a reply to the packet relaying unit 206. Note that it is possible to evaluate the congestion state of the access interface according to the number of packets put on standby in the packet buffer.

Note that it is also possible to add a procedure for deleting an entry for a router from which a packet has not arrived for a fixed time from the flow table.

Operation of the relay determining unit 205 of the router 12 will now be explained using FIG. 10. The router 12 includes an access interface for communication with a PHS.

First, the relay determining unit 205 starts in response to an inquiry from the packet relaying unit 206 and checks whether the access interface is congested (step S101). If the access interface is not congested, the relay determining unit 205 judges that relay is possible (step S102), sends a response to the packet relaying unit 206, and then ends its operation.

On the other hand, if the access interface is congested (step S102), the relay determining unit 205 checks whether the received data packet is an audio sound packet (step S103). If the data packet is a sound packet, the relay determining unit 205 judges that relay is possible (step S102) and ends its operation. If the data packet is not a sound packet, the relay determining unit 205 judges that relay is impossible (step S104) and ends its operation. Note that it is possible to judge whether the data packet is a sound packet by, for example, referring to a port number of TCP/UDP. It is judged whether the data packet is a sound packet because the transmission band of the PHS, to which the router 12 is connected, is 64 kbps and, in transmission at a relatively low transfer rate like transmission of sound, the PHS has the capability to transmit sound without interruption even if the access interface is congested.

Operation of the relay determining unit 205 of the router 13 will now be explained using FIG. 11. The router 13 includes an access interface for a wireless LAN.

First, the relay determining unit 205 starts in response to an inquiry from the packet relaying unit 206 and checks whether the access interface is congested (step S111). If the access interface is not congested, the relay determining unit 205 judges that relay is possible (step S112) and ends its operation. On the other hand, if the access interface is not congested, the relay determining unit 205 judges that relay is impossible (step S113), sends a response to the packet relaying unit 206, and ends its operation.

In this way, the relay determining unit 205 of each of the respective routers 11 to 13 determines whether relay to another segment should be performed. Note that, in this embodiment, the conditions for judging whether relay should be performed are congestion state and transmission capability of the line and type of packet flow. However, it is also possible to judge whether relay should be performed based on the transmission cost of respective communication lines.

It is also possible to judge whether relay should be performed on the basis of characteristics of the external network to which the access interface 209 is connected. This case will be explained using FIGS. 15 and 16.

Figure 15:
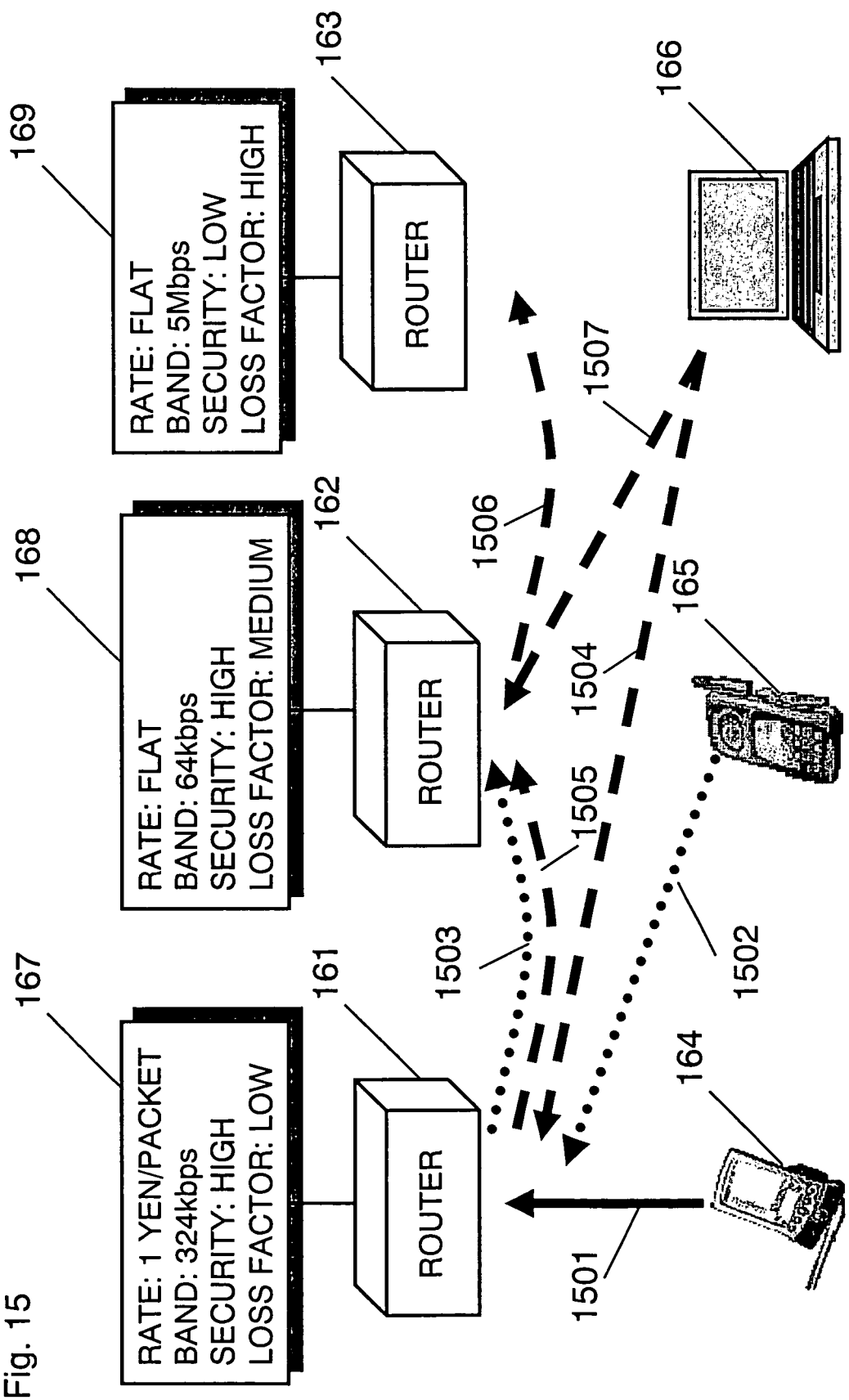
FIG. 15 is a diagram for describing an example of correspondence made between characteristics of routers and relay judgment in the first or the second embodiment of the invention.

FIG. 15 is a diagram showing a LAN including three router apparatuses (161 to 163) and three kinds of terminals (a movie terminal 164, an IP telephone 165, and a laptop PC 166) in the invention.

External networks to which the access interfaces 209 of the respective routers are connected have characteristics as described in FIG. 15. In external network 167 to which the router 161 is connected, the rate is 1 yen/packet, a communication band is 324 kbps, security is high, and loss factor is low. In an external network 168 to which the router 162 is connected, the rate is flat, a communication band is 64 kbps, security is high, and loss factor is at a medium level. In an external network 169 to which the router 163 is connected, the rate is flat, a communication band is 5 Mbps, security is low, and a loss factor is high. In this case, conditions for judging whether the respective routers 161 to 163 should relay a data packet are as described below.

Condition for the router 161: The router 161 gives preference to relay of moving image flow. This is because a moving image requires a certain degree of bandwidth, a low loss factor, and high security.

Condition for the router 162: The router 162 gives preference to relay of sound flow. This is because a sound flow does not require as much bandwidth and as low a loss factor as a moving image.

Condition for the router 163: The router 163 relays flows other than a sound flow or a moving image flow. When the router 163 transfers a flow to another router and the same flow (data packet) arrives again, the router 163 relays the flow.

Figure 16:
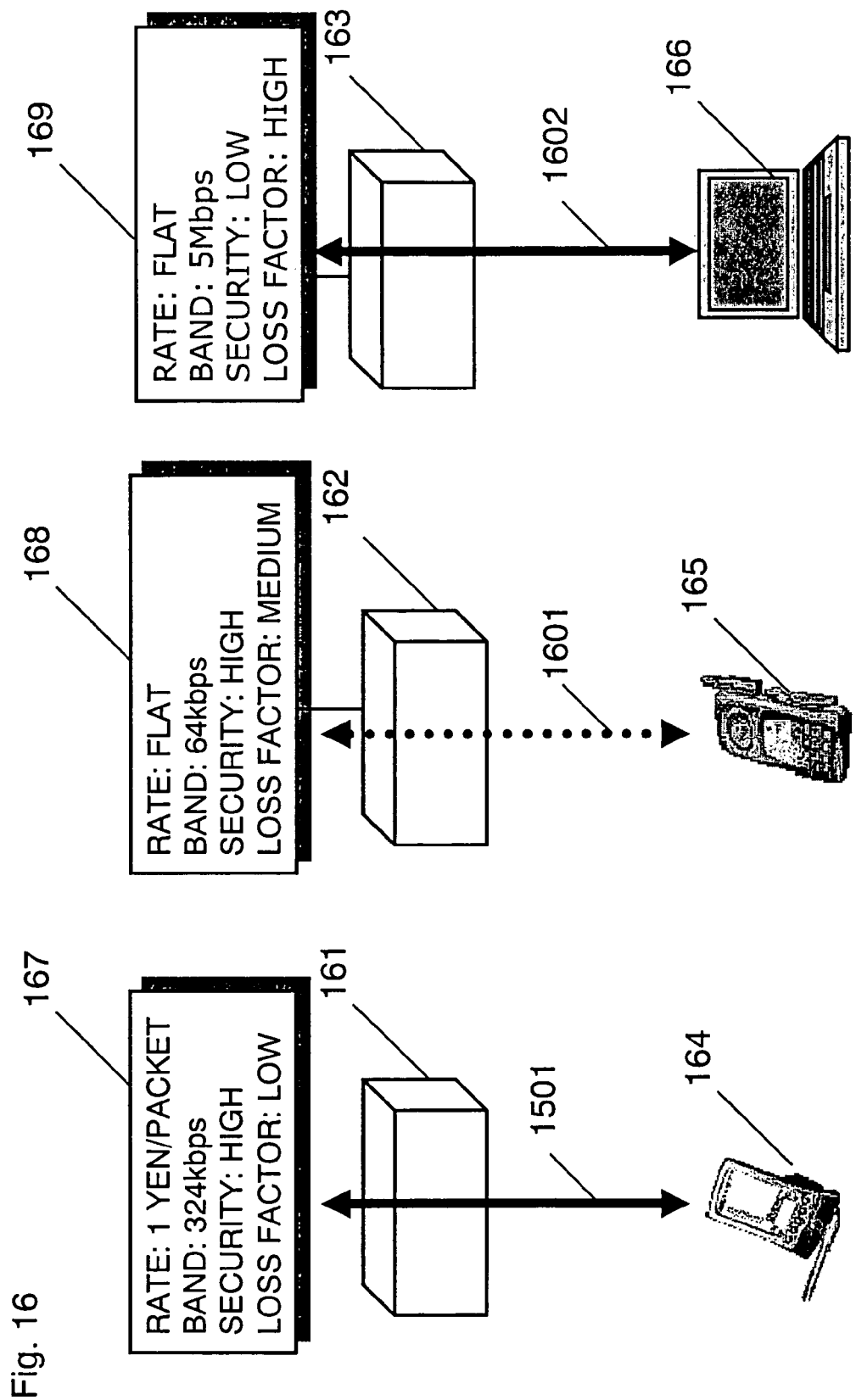
FIG. 16 is a diagram for describing an example of correspondence made between characteristics of routers and relay judgment in the first or the second embodiment of the invention.

When the respective terminals start communication under such conditions, according to the method of the invention, as shown in FIG. 15, a flow transmitted by the respective terminals is redirected until a router suitable for the flow is selected. Thus, as shown in FIG. 16, routers for relaying the flows of the respective terminals are determined.

In other words, because the data packet 1501 which the movie terminal 164 transmits to the router 161 meets the condition for the router 161, the data packet 1501 is directly relayed to the external network 167. However, because the data packet 1502 which the IP telephone 165 transmits to the router 161 does not meet the condition for the router 161, the packet 1502 is transferred (1503) to the router 162. At this point, a redirection message is sent which instructs that the router 168 shall relay the data packet 1502 from the router 161 to the IP telephone 165. Thus, as shown in FIG. 16, after that, the IP telephone 165 transmits (1601) packets to the router 162.

Similarly, in the beginning, the laptop PC 166 transmits a packet 1504 to the router 161. However, since the data packet 1504 does not match the condition for the router 161, the packet 1504 is transferred (1505) to the router 162 that has the next transfer priority. Since the data packet 1504 does not match the condition for relay by the router 162 either, the data packet 1504 is once again transferred (1506), this time to the router 163. Since the data packet 1504 matches the condition for the router 163, the router 163 transmits the data packet 1504 to the network 169. At this point, a redirection message is transmitted from the router 161 to the laptop PC 166. The laptop PC 166 transmits a data packet 1507 to the router 162. However, since the data packet 1507 does not match the condition for the router 162, the data packet 1507 is transferred (1506) to the router 163. Then, the router 162 also transmits a redirection message which instructs the router 163 to relay the data packet 1507 to the laptop PC 166. In response to the redirection message, after that, as shown in FIG. 16, the laptop PC 166 directly transmits a data packet 1602 to the router 163.

Figure 8:
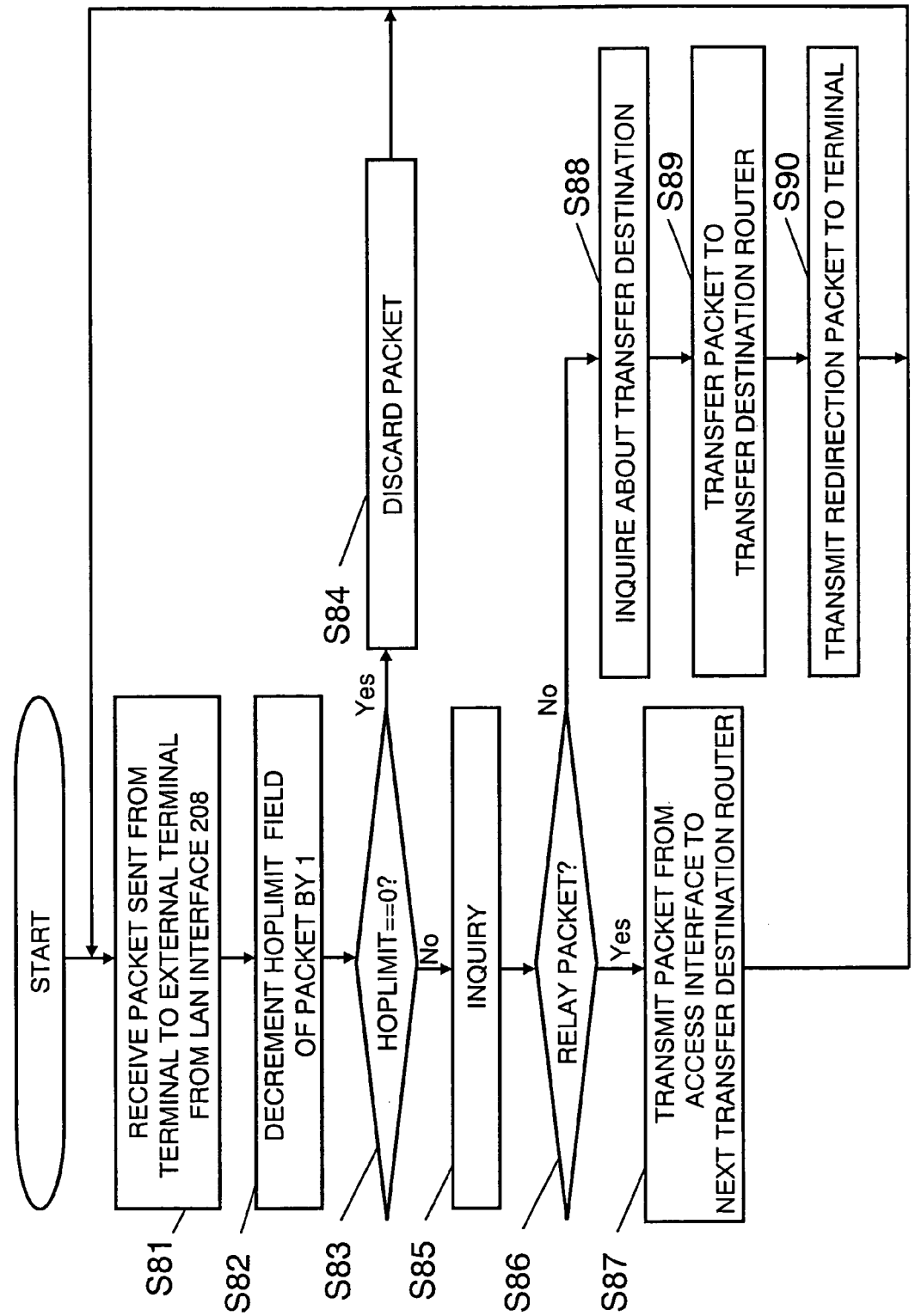
FIG. 8 is a flowchart of packet processing from a terminal of a router in the first embodiment and the second embodiment of the invention.

Note that it is assumed that the default router is the router 161 and the transfer sequential order is: router 161, router 162, router 163. FIG. 8 is a flowchart for explaining operation of the packet relaying unit 206.

First, when the packet relaying unit 206 receives from the LAN interface 208 a packet whose destination is a terminal of an external network (step S81), the packet relaying unit 206 decrements the value of the Hop Limit field of the IPv6 header by 1 (step S82). The packet relaying unit 206 checks whether a value of the Hop Limit field is '0' as a result of the decrement (step S83). If the value is '0', the packet relaying unit 206 discards the packet (step S84).

When the value of the Hop Limit field is larger than 0, the packet relaying unit 206 asks the relay determining unit 205 whether the packet should be relayed (step S85).

When the packet relaying unit 206 is instructed to relay the packet by the relay determining unit 205 (step S86), the packet relaying unit 206 transmits the packet to the transfer destination, a router of an external network which is another segment, via the access interface 209 in accordance with a routing table (step S87).

On the other hand, when the packet relaying unit 206 is not instructed to relay the packet, the packet relaying unit 206 asks the order determining unit 207 which of the routers in the same segment shall be the transfer destination of the received data (step S88).

The packet relaying unit 206 transfers the packet to the router indicated by the order determining unit 207 (step S89) and transmits a redirect packet, in which the new router that should be set to relay the packet to the destination terminal is described, to the terminal which is the transmission source (step S90). The data format of the redirect packet is shown in FIG. 13.

This is the format of the Internet Control Message Protocol version 6 (ICMPv6) redirect packet.

Figure 13:
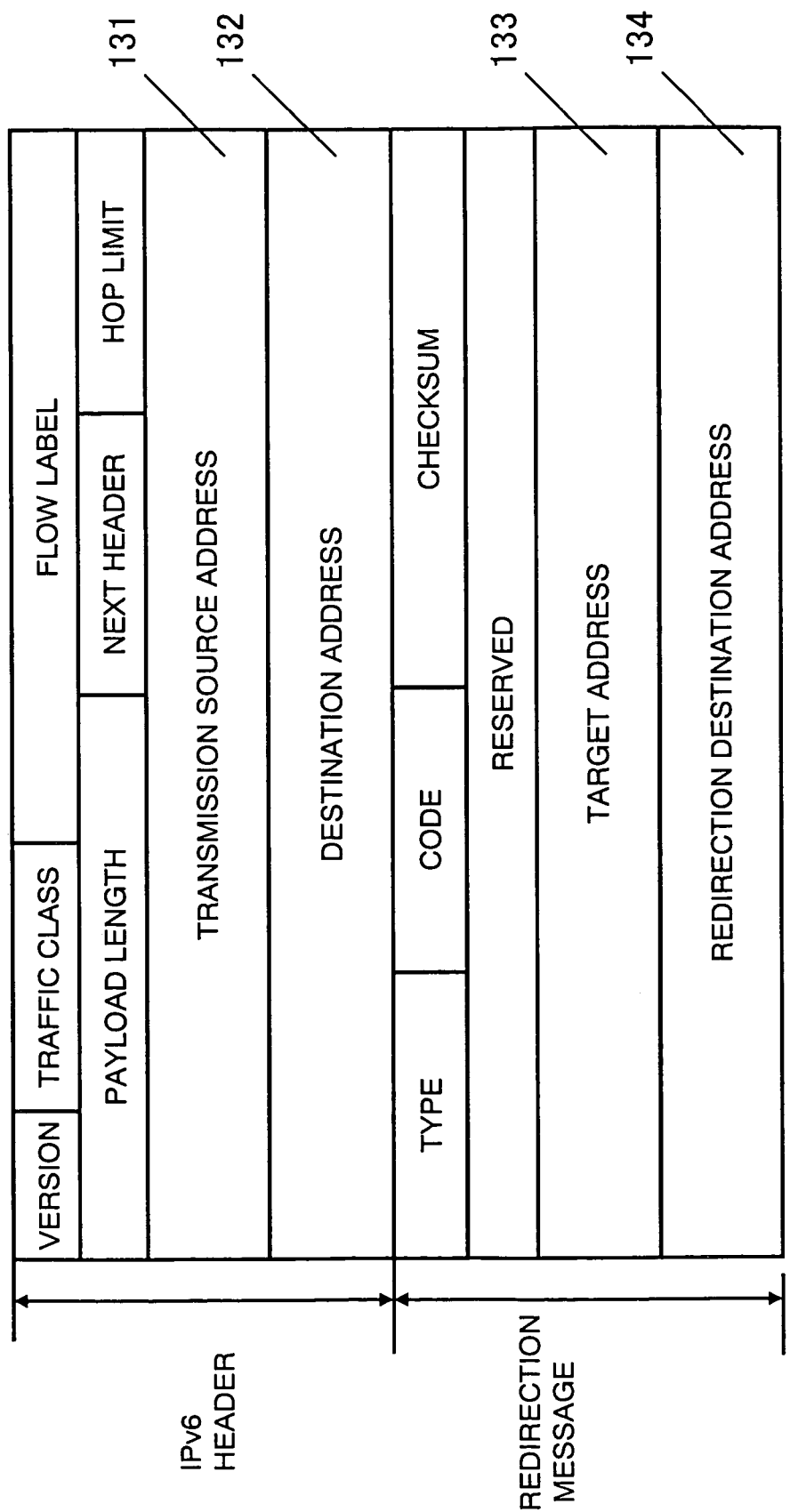
FIG. 13 is a format chart of a redirect packet in the first to the third embodiments of the invention.

In FIG. 13, an address of the router which is the transmission source of the redirect packet is written in a transmission source address (Src Address) field (131). The address of the terminal which is the transmission destination of the packet to be redirected is written in the destination (Dst Address) field (132). The address of the router which is the redirection destination is written in the target address field (133). The destination address of the packet to be redirected is written in the redirection destination (Dst Address) field (134). Note that, although ICMPv6 is used in this embodiment, it is also possible to use Internet Control Message Protocol version 4 (ICMPv4).

Thereafter, the packet relaying unit 206 returns to step S81. When the transferred packet continues to be transferred without being relayed by any router, the value of the Hop Limit field is decremented in step S82 every time the packet is transferred. When the value of the Hop Limit field is reduced to '0', the packet is discarded in step S84.

Data packet relay processing and redirection processing for the routers 11 to 13 are performed by the relay determining unit 205, the packet relaying unit 206, and the order determining unit 207.

When the packet relaying unit 206 receives data packets which were transmitted from the terminals 14 and 15 in the same segment and which are to be transmitted to the external terminals 16 and 17 in another segment via the LAN interface, the packet relaying unit 206 asks the relay determining unit 205 whether it is possible to relay the data packets. The relay determining unit 205 determines whether it is possible to relay the data packets in accordance with predetermined conditions. If the data packets can be relayed, the packet relaying unit 206 transfers the data packets to a router in an external network via the access interface 209 according to the routing table. If the data packets cannot be relayed, the packet relaying unit 206 asks the router determining unit 203 which of the routers in the same segment shall be the next relay router. The router determining unit 203 determines the next relay router in accordance with the order table. The packet relaying unit 206 transfers the data packets to the designated router via the LAN interface 208 and transmits a redirect packet to the terminal which is the transmission source.

When a packet is received through the access interface 209, the packet relaying unit 206 checks whether the destination of the packet is a terminal in the LAN 1. Then, the packet is transmitted from the LAN interface 208.

The terminal 14 performance of data transmission with the external terminal 16 using the FTP (communication speed is undefined; the speed changes according to line capacity) and the terminal 15 performance of sound communication (communication speed: 60 kbps) and moving image communication (communication speed: 300 kbps) with the external terminal 17 will be explained. In the following explanation, it is assumed that the network in this embodiment is an Internet Protocol version 6 (IPv6) network. However, the network is not limited to IPv6 and is operable with Internet Protocol version 4 (IPv4). For simplicity of explanation, IPv6 addresses of the LAN interfaces for the routers 11, 12, and 13 are assumed to be fe80::11, fe80::12, and fe80::13, respectively, and IPv6 addresses of the terminals 14 and 15 and the external terminals 16 and 17 are assumed to be 3::14, 3::15, 4::16, and 4::17, respectively.

Note that the access interfaces and the LAN interfaces described above may be either wire interfaces or radio interfaces.

The respective routers periodically transmit RA packets as shown in FIGS. 4 and 6. However, the order of transmission of the RA packets varies depending on startup times of the routers and other factors.

First, the router 11 multicasts an RA packet (step S21). The terminals 14 and 15 which have received the RA packet transmitted by the router 11 set the router 11 as the default router. Therefore, the terminals 14 and 15 always transmit packets first to the router 11 which is set as the relay destination.

Subsequently, the router 13 transmits an RA packet (step S22). Lastly, the router 12 transmits an RA packet (step S23). In this way, the respective routers create the order table shown in FIG. 5C.

Figure 3:
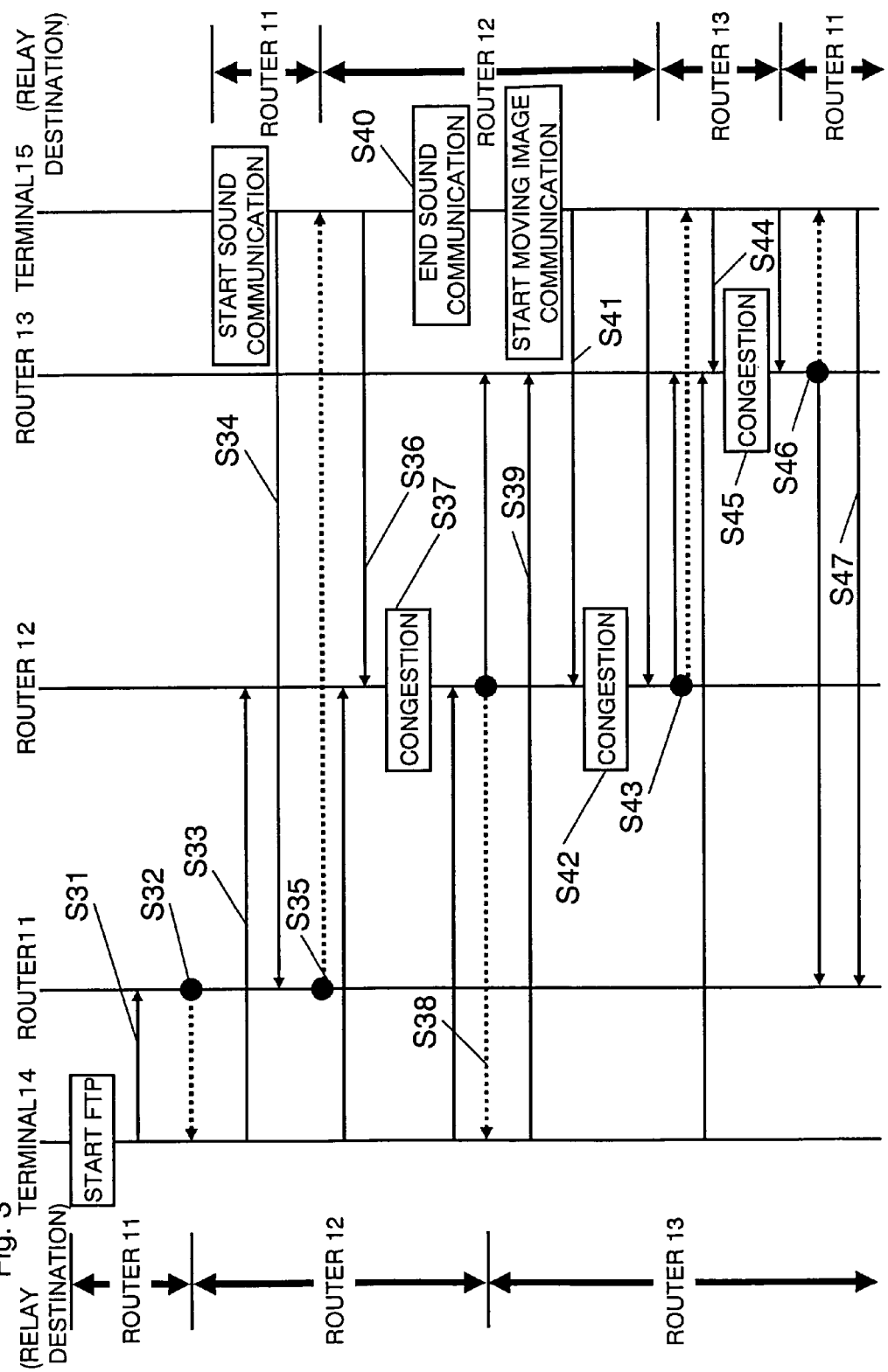
FIG. 3 is a diagram showing a transmission sequence of a data packet and a redirect packet in the first embodiment of the invention.

FIG. 3 is a diagram showing the sequence at the time when the terminal 14 and the terminal 15 communicate with each other. Note that, in the figure, arrows of solid lines indicate transmission of a data packet and arrows of dotted lines indicate transmission of a redirect packet. Black circles indicate transmission sources of the redirect packets.

First, the terminal 14 starts communication with the external terminal 16 using the FTP and transmits a data packet to the router 11 serving as the default gateway (step S31). Since there is no entry for router 11 in the flow table, the router 11 adds an entry in the flow table (FIG. 14A). However, since communication cost is high, the router 11 sets the state column of the flow table to Redirected in accordance with conditions set in advance, and always transfers the packet arriving first to the other routers. This is performed in accordance with the order table in FIG. 5C. The router 11 transfers the data packet which has been received to the router 12. At the same time, the router 11 transmits a redirect packet, in which the router 12 is designated as the relay destination, to the terminal 14 (step S32).

The terminal 14 receives the redirect packet and transmits the next packet to the router 12 which is the new relay destination, and continues communication (step S33).

Subsequently, the terminal 15 starts sound communication (60 kbps) with the external terminal 17 and transmits a packet to the router 11 serving as the default gateway (step S34). Since there is no entry for router 11 in the flow table, the router 11 adds an entry in the flow table (FIG. 14B) and transmits to the terminal 15 a redirect packet indicating redirection to the router 12, as in step S32 (step S35).

The terminal 15 receives the redirect packet and transmits the data packet to the router 12 to attempt to continue the communication (step S36). However, since the terminal 14 already communicates via the router 12, data packets concentrate on the router 12 to cause congestion (step S37). Since the router 12 is set to redirect packets other than sound communication packets at the time of congestion, the router 12 transmits to the terminal 14 that is performing FTP communication a redirect packet indicating redirection to router 13 (step S38). The selection of the relay router is also performed in accordance with the order table in FIG. 5C.

The terminal 14 receives the redirect packet and continues communication, using the router 13 as the relay destination (step S39).

Subsequently, the terminal 15 ends the sound communication with the external terminal 17 (step S40) and transmits a data packet to the router 12 (step S41) in order to start moving image communication (300 kbps) with the same external terminal 17. However, in the moving image communication, unlike the sound communication at 60 kbps, the terminal 15 needs to transmit a packet at speed of 300 kbps. Thus, the line capacity 64 kbps of the router 12 is exceeded and congestion arises (step S42).

Because of this congestion, the router 12 transfers the data packet received from the terminal 15 to the router 13 in accordance with the order table in FIG. 5C and transmits the redirect packet for redirection to the router 13 to the terminal 15 (step S43).

The terminal 15 receives the redirect packet and attempts to continue the communication with the router 13 as the relay destination (step S44). However, since the line capacity of the router 13 is fully used by the FTP communication between the terminal 14 and the external terminal 16, congestion arises (step S45). Therefore, the router 13 transfers the data packet received from the terminal 15 to the router 11 in accordance with the order table in FIG. 5C and transmits the redirect packet for redirection to the router 11 to the terminal 15 (step S46).

The terminal 15 receives the redirect packet and transmits a packet to the router 11 (step S47). The router 11 refers to the flow table (FIG. 14B) and, since there is information of the terminal 15 in entry 2, the state space is Redirected, and the access interface is not congested, the router changes the state in the flow table to Active (FIG. 14C) and performs relay. Subsequently, the terminal 15 continues the communication with the router 11 as a relay destination.

Note that, in the sequence, when a router judges that it is impossible to relay the received data packet, the router transfers the data packet to the router which has become the new relay destination. However, it is also possible to discard the received data packet. In this case, it is necessary to inform the transmission source terminal with an ICMP error message or the like that the packet is discarded.

As described above, according to the invention, a router creates an order table common to all routers on the basis of RA packets received from the other routers and, depending on the congestion state and transmission capability of the line to be accessed, may transfer the received data packet to another router in the same segment in accordance with the order table. Therefore, in the end a router suitable for transfer of the data packet to an external network is selected. Since a terminal may perform router selection merely following the router redirection message it is unnecessary to add a new function to the terminal. Moreover, each of the routers only has to perform relay judgment processing according to characteristics of that router and does not need to acquire characteristics of the other routers in advance. This makes it unnecessary to change a setting at the time of addition and deletion of a router. Consequently, the degree of freedom of access capability information itself is improved. In other words, it is possible to define the access capability of a certain router to be only the congestion state of the access interface as and define the access capability in another router a packet loss factor of an access network.

Second Embodiment

A network constitution in this embodiment is different from the first embodiment shown in FIG. 1 in that routers to which the router selecting method in the invention can be applied and those which cannot be unaware (hereinafter referred to as unaware routers) are present in the same LAN. In this embodiment, an order table is formed only including routers to which the router selecting method in the invention can be applied (hereinafter referred to as applicable routers). The unaware routers are stored separately. A data packet is transferred to the unaware routers only when the relay router cannot be selected from among the applicable routers.

Differences from the first embodiment will be explained concerning the constitution and operation of a router in this embodiment.

Figure 18:
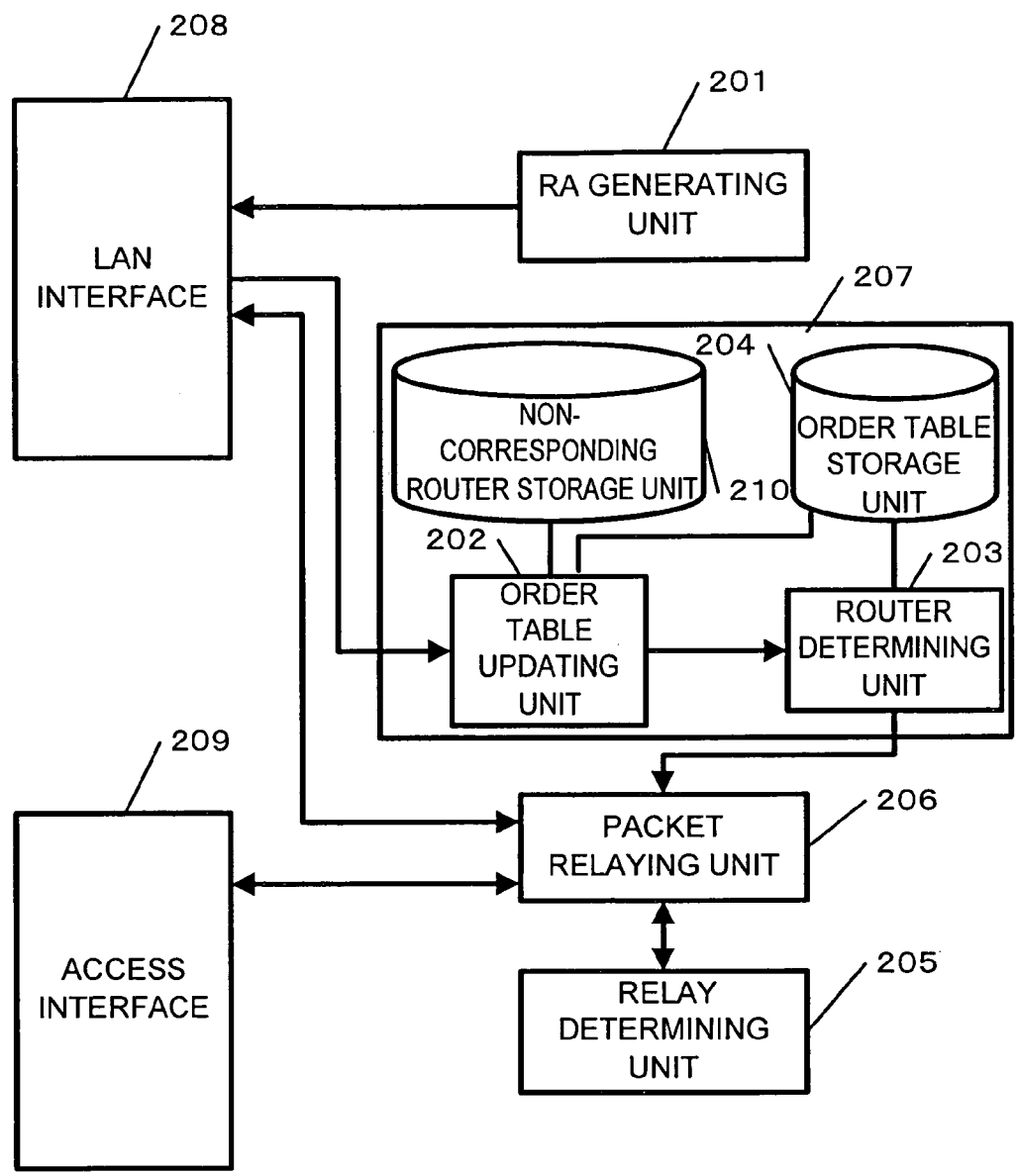
FIG. 18 is a diagram of the router in the second embodiment of the invention.

FIG. 18 is a block diagram showing the constitution of the router in this embodiment.

The constitution of the router is different from the constitution of the router in the first embodiment (FIG. 2) in that the router has an unaware router storage unit 210.

The unaware router storage unit 210 is a storage unit for storing information of the unaware routers in an unaware router list, when the router receives an RA packet from an unaware router.

Figure 19:
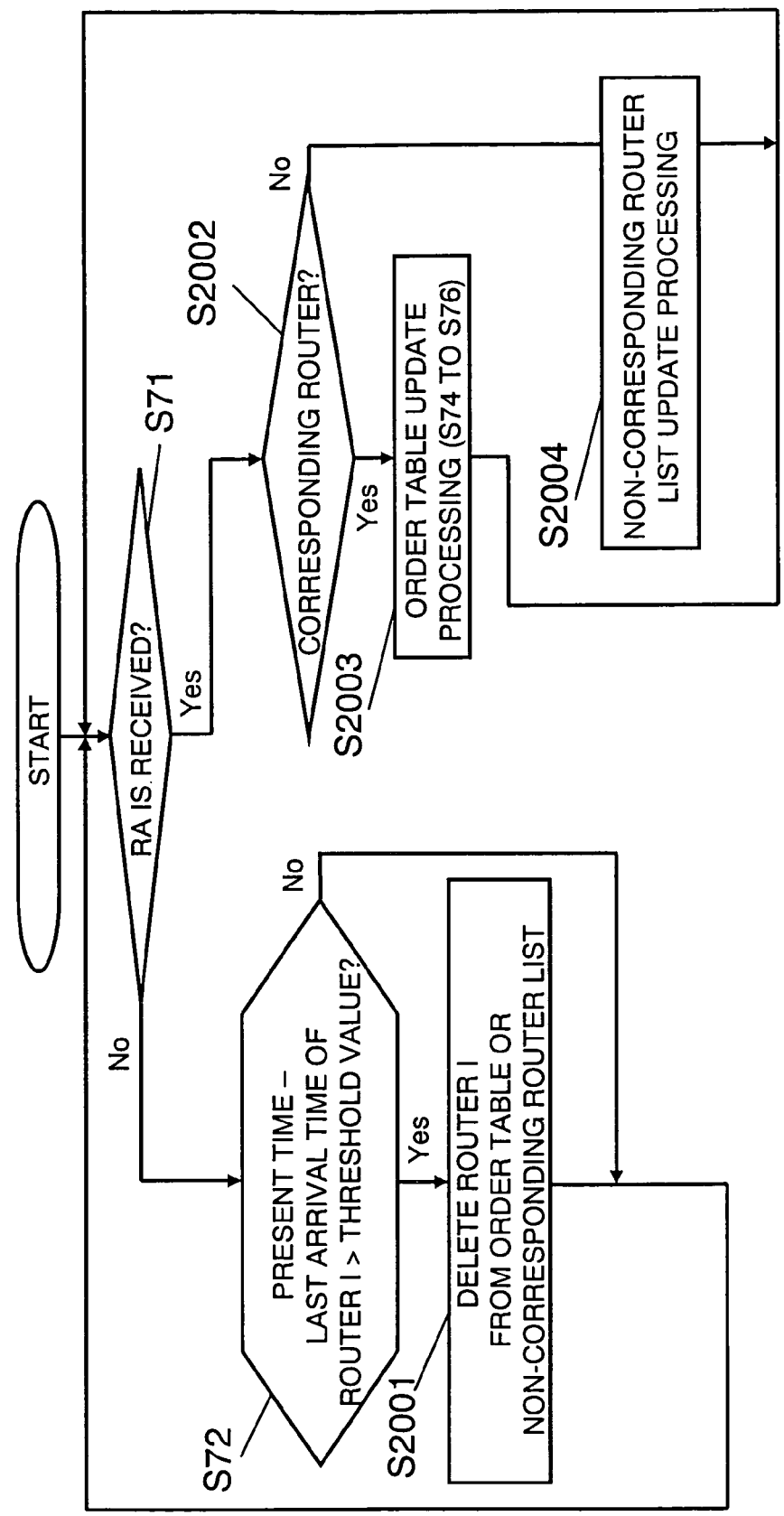
FIG. 19 is a flowchart of order table maintenance processing in the second embodiment of the invention.

FIG. 19 is a flowchart for explaining operation of the order determining unit 207 in this embodiment.

When the router receives an RA packet (step S71), the order table updating unit 202 checks whether the router which transmitted the packet is applicable to the invention (step S2002).

Figure 17:
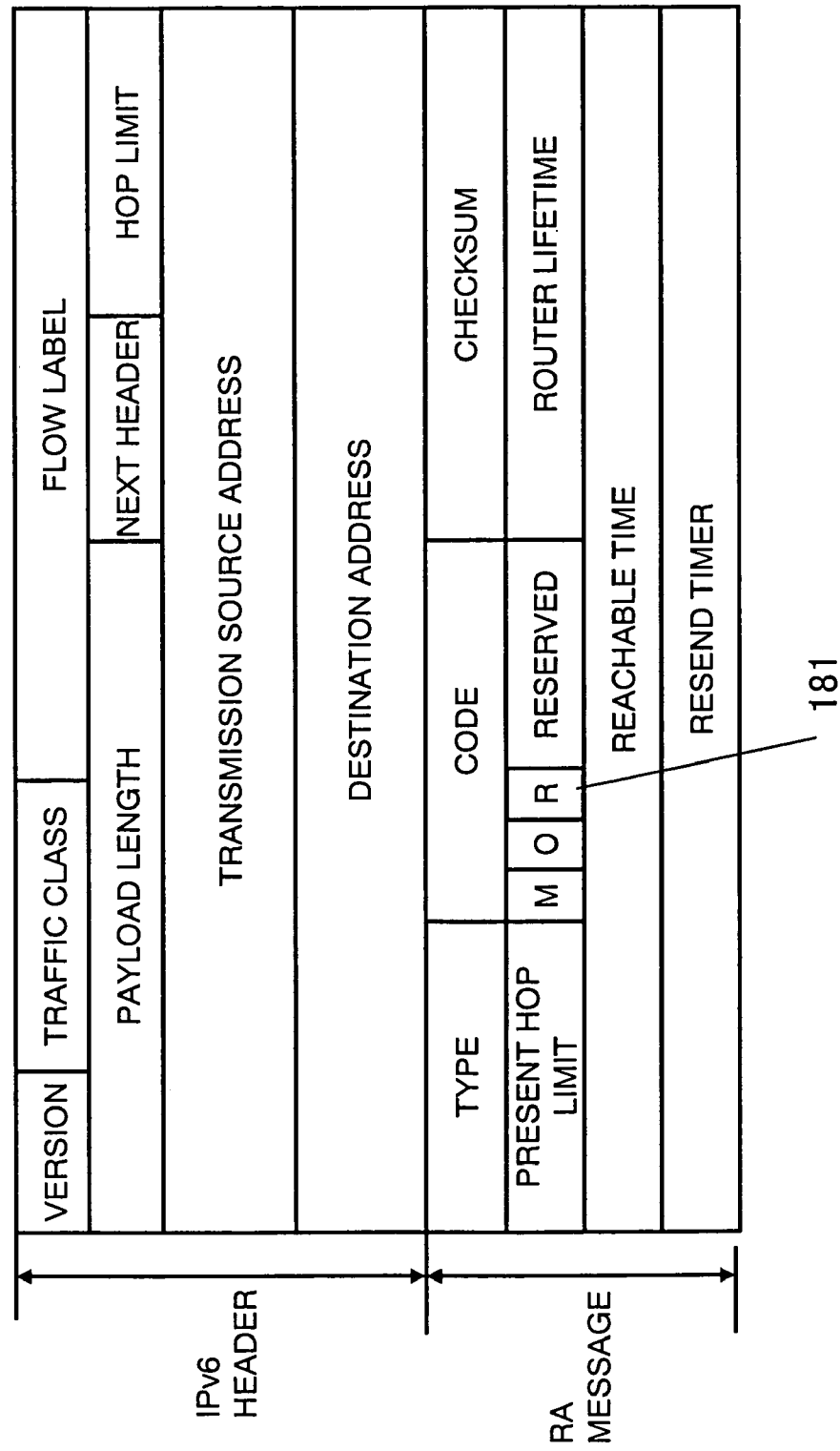
FIG. 17 is a format chart of a router advertisement packet in the second embodiment of the invention.

An example of the format of the RA packet used in this embodiment is shown in FIG. 17. The RA packet in this embodiment is different from the RA packet in the first embodiment (FIG. 12) in that the RA packet in this embodiment has an R (Redirect) flag 181. The R flag is a flag for indicating that the router is applicable to the invention. The router sets "1" in the R flag 181 and multicasts the RA packet at the time of transmission of the RA packet.

Therefore, the order table updating unit 202 checks whether the router at the transmission source corresponds to the invention (step S2002) by checking whether the R flag 181 is "1".

When the router at the transmission source is an applicable router, the order table updating unit 202 performs the same order table update processing as steps S74 to S76 in FIG. 7 (step S2003).

On the other hand, when the router at the transmission source is an unaware router, the order table updating unit 202 performs substantially the same list update processing as steps S74 to S76 (step S2004). This is processing for storing the address of the unaware router in the unaware router storage unit 210 list. When the router receives an RA packet from a new unaware router, the order table updating unit 202 adds an address of the unaware router in the list. When the router receives an RA packet from an unaware router already stored in the list, the order table updating unit 202 updates the last arrival time of that router.

When the router is not receiving an RA packet (step S71), the order table updating unit 202 deletes the entry in the order table and in the unaware router list of a router from which an RA packet has not been received for a fixed time (steps S72 and S2001).

Operation of the packet relaying unit 206 in this embodiment will now be explained using FIG. 8.

The operation of the packet relaying unit 206 in this embodiment is different from the operation in the first embodiment with regard to the transfer destination inquiry processing (step S88).

In the first embodiment, an applicable router is selected as the transfer destination from the order table. However, in this embodiment, the transfer destination is selected from the unaware router list when predefined conditions are satisfied.

The predefined conditions are, for example, as described below.

(1) The Hop Limit field in an IPv6 header is smaller than a threshold value defined in advance.

(2) The same packet is transferred a predefined number of times or more.

When a router that can relay the packet is not present among the applicable routers and it is highly likely that the packet has been transferred to one router many times, the router transfers the packet to an unaware router. Note that the method of selecting a transfer destination from the unaware router list is not specifically limited. For example, it is possible to use a method such as selecting an unaware router at random or selecting an unaware router in order from the smallest address number. Giving consideration to distribution of loads, such methods are preferable to prevent the selection from concentrating on a specific unaware router.

Figure 20:
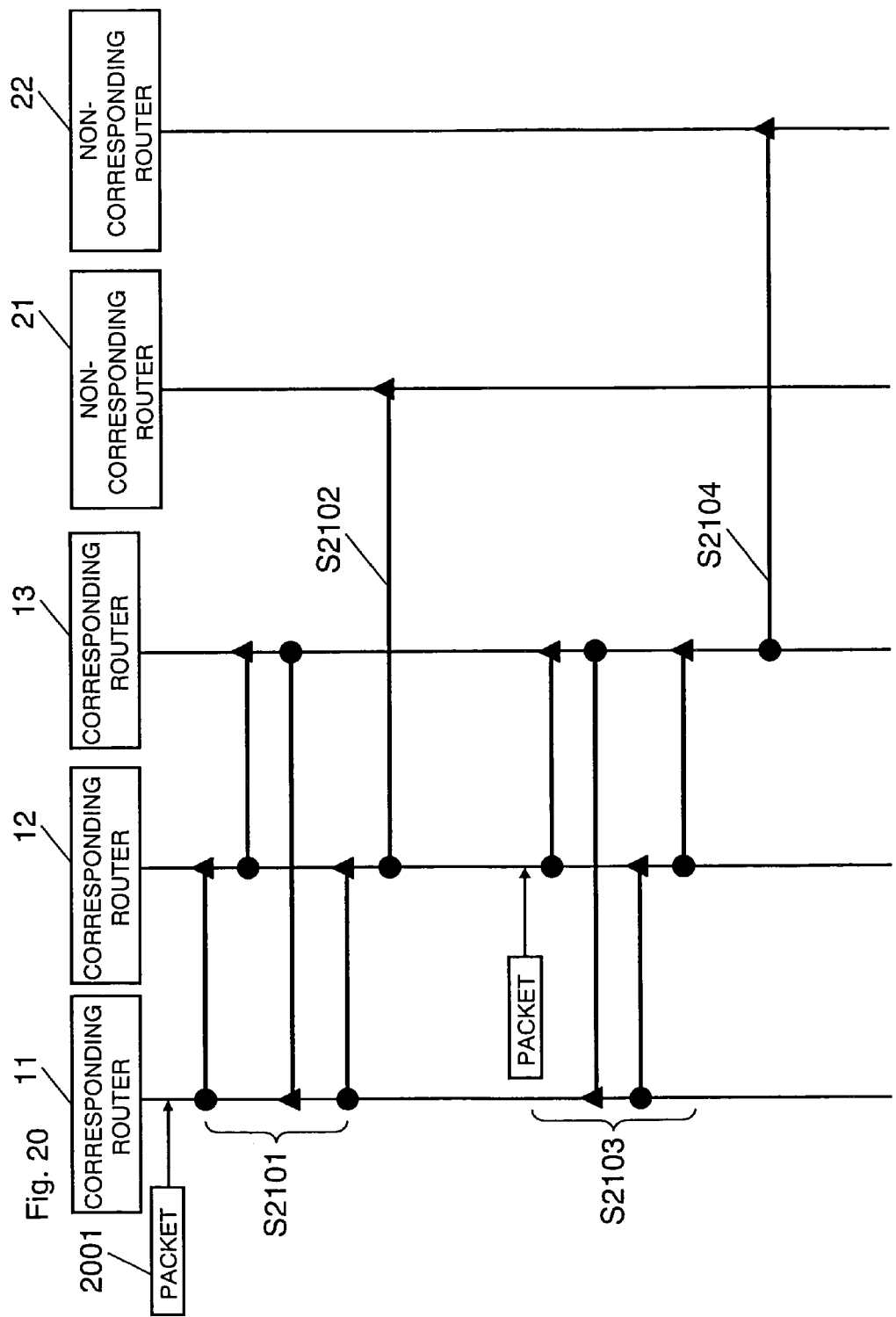
FIG. 20 is a sequence chart for explaining a redirection destination of the router in the second embodiment of the invention.

It will now be explained using FIG. 20 how a packet is transferred by the router constituted as described above. There are three applicable routers (applicable routers 11 to 13) and two unaware routers (unaware routers 21 and 22) in the LAN 1. The applicable routers 11 to 13 create an order table using RA packets thereof, create an unaware router list using RA packets transmitted from the unaware routers 21 and 22, and store the order table and the unaware router list. Note that, in FIG. 20, triangles indicate routers which are redirection destinations and circles indicate transmission sources of redirect packets.

First, in the case in which a packet 2001 arrives at the applicable router 11, in the case where none of the applicable routers 11 to 13 can relay the packet, the packet is transferred from the applicable router 11 to the applicable router 12, from the applicable router 12 to the applicable router 13, and from the applicable router 13 to the applicable router 11. When the packet is transferred from the applicable router 11 to the applicable router 12 again (step S2101), the applicable router 12 judges that a value of a Hop Limit field is equal to or smaller than the threshold value and transfers the packet to the unaware router 21 (step S2102). The unaware router 21 judges whether it is possible to relay the packet received. When it is possible to relay the packet, the unaware router 21 transmits the packet to an external network. When it is impossible to transmit the packet, the unaware router 21 discards the packet.

Similarly, in the case in which a packet arrives at the applicable router 12, after the packet is continuously transferred among the applicable routers (step S2103), the applicable router 13 redirects the packet to the unaware router 22 (step S2104).

As described above, according to the invention, even if a router not applicable to the invention is included in routers in a LAN, a packet is transferred to the unaware router according to conditions defined in advance. Thus, it is possible to distribute the load of relay processing.

Third Embodiment

Figure 21:
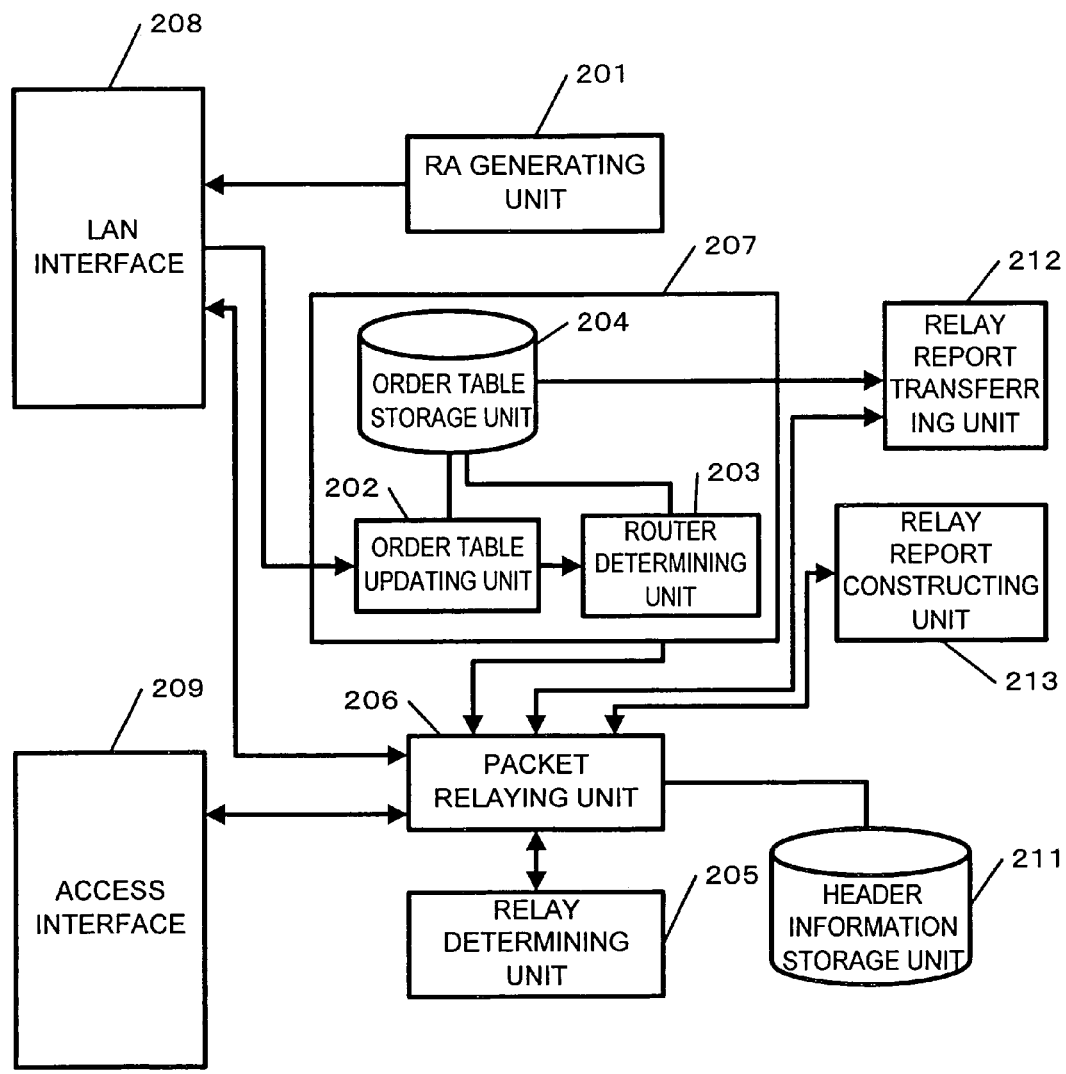
FIG. 21 is a diagram of the router in the third embodiment of the invention.

In a router selecting method in this embodiment, a router does not transmit a redirection message to a terminal which transmitted the packet while the router is transferring a packet to another router and transmits the redirection message for the first time when a router that shall perform relay processing is decided. FIG. 21 is a block diagram showing the constitution of a router in this embodiment. The constitution of this router is different from the constitution of the router in the first embodiment shown in FIG. 2 in that the router has a header information storage unit 211, a relay report transferring unit 212, and a relay report constructing unit 213.

The header information storage unit 211 stores header information. If the relay determining unit 205 determines that the router shall not relay the data packet and if this is the original router to transfer the packet, the header information storage unit 211 stores header information of the data packet.

The relay report constructing unit 213 generates a relay report message reporting that the router sending this message shall relay the packet. A form of the relay report message is shown in FIGS. 27A and 27B.

Figure 27:
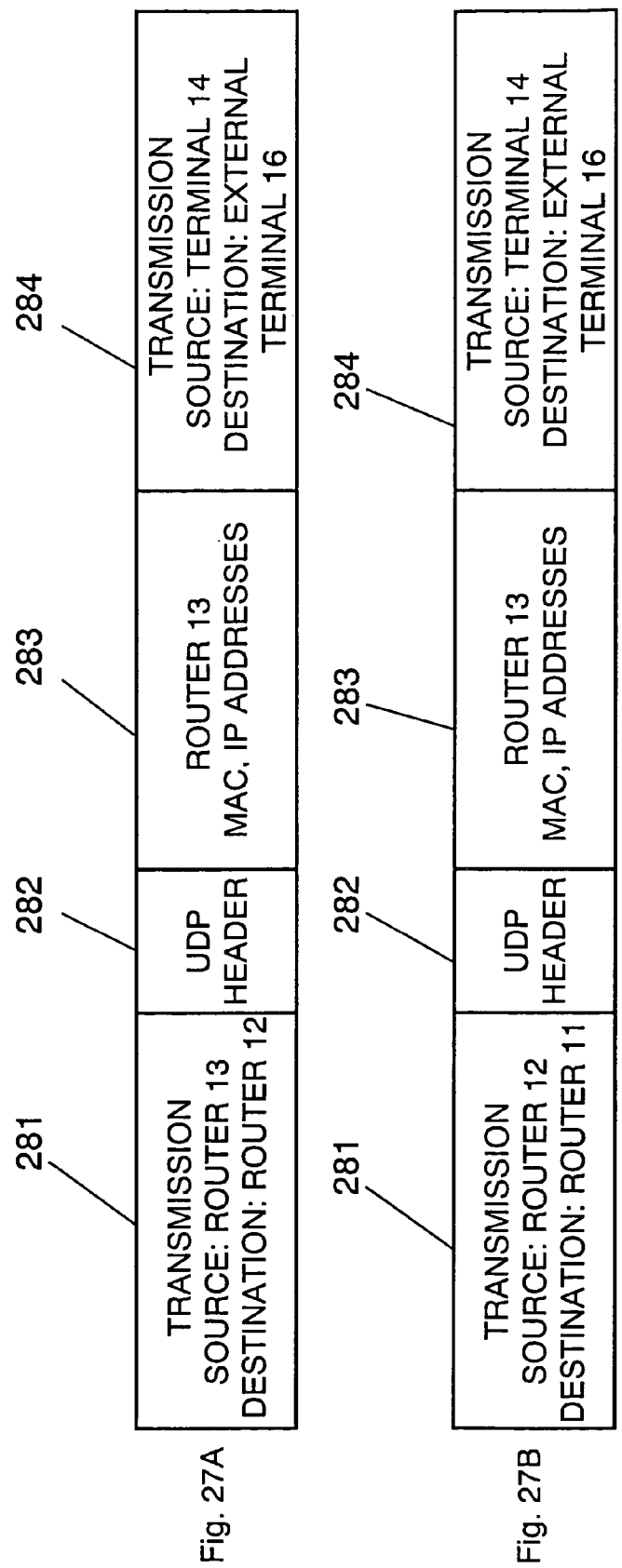
FIGS. 27A and 27B are format charts of a relay report message in the third embodiment of the invention.
Figure 28:
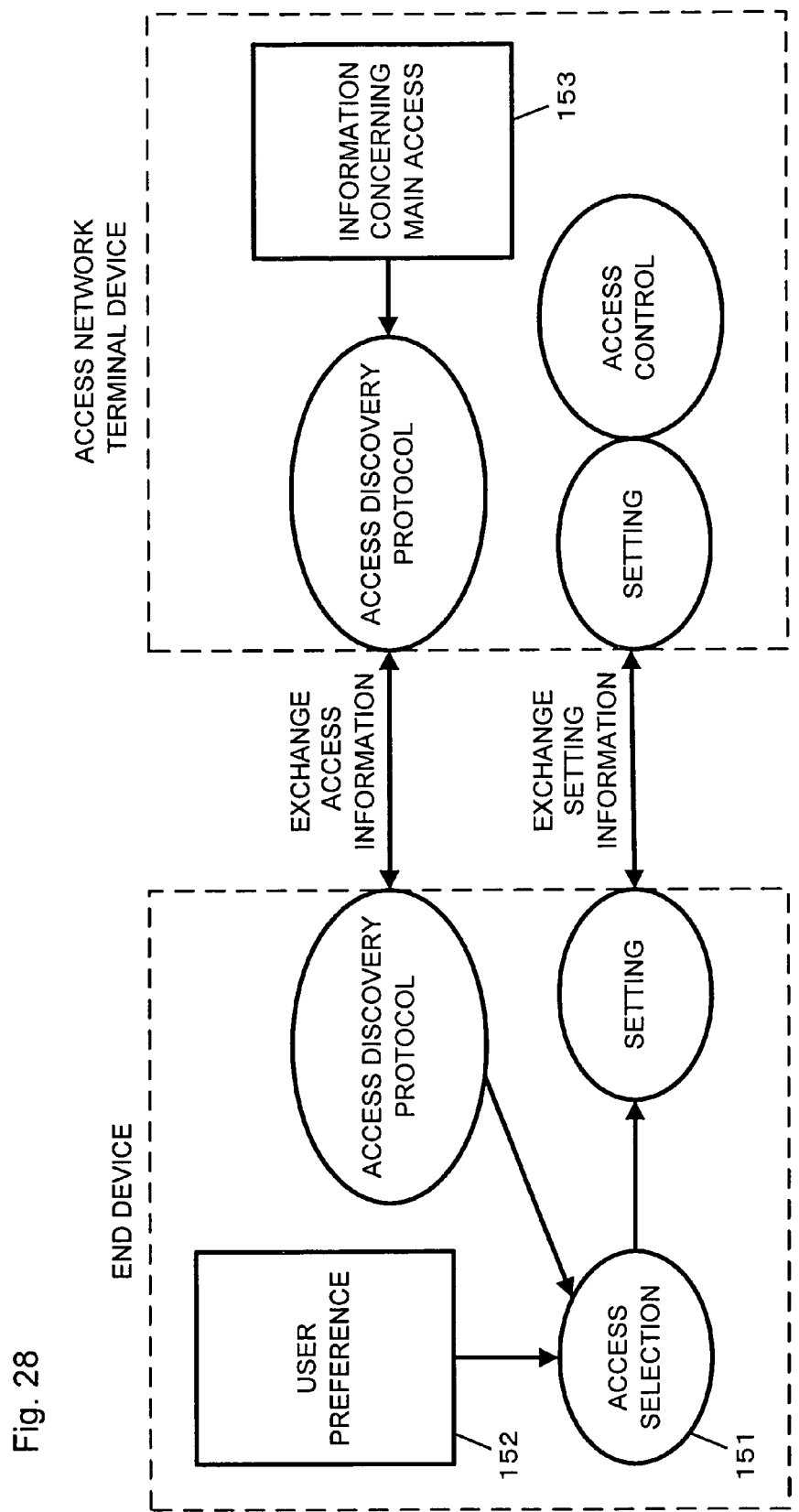
FIG. 28 is a diagram for explaining the conventional router selecting method.

In FIGS. 27A and 27B, IP addresses of the transmission source and the transmission destination are set in an IP header 281. The port number of the message is set in a UDP header 282. Note that a TCP header may be used as the UDP header 282, and that neither TCP nor UDP need be used.

Information on the router which is selected to relay a packet is set in relay router information 283. The information includes, for example, the IP address, MAC address, and the like of a relay router. Note that the relay router information 283 is used for setting the redirect destination in the redirect packet that the router which transferred the data packet first transmits to the transmission source terminal. However, the information of the IP address need not be included in the relay router information 283 if the IP address of the router which is selected to relay the packet is set in the IP header 281 and the router which transfers the relay report message is kept from changing its IP header.

Header information of a data packet is described in packet header information 284. Among the information described in the transmission source and transmission destination IP addresses and other IP headers, information described in the TCP and UDP headers, and the like, information which is necessary is set in the packet header information 284. Note that the packet header information 284 is used for the router to judge whether it should transmit the redirect packet.

When the relay report transferring unit 212 receives this relay report message, if the header information of a data packet included in the relay report message matches that stored in the header information storage unit 211, this means that the router is the first to transfer the packet, and so the relay report transferring unit 212 instructs the packet relaying unit 206 to transmit a redirect packet. If the header information is not stored in the header information storage unit 211, the relay report transferring unit 212 transfers a relay report message to the transfer source router which transferred the packet.

The form of an order table held by the router in this embodiment is shown in FIG. 22. A physical layer address (e.g., a MAC address) of the router is stored in the order table in an addition to the form in the first embodiment (FIGS. 5A to 5C). This is because the physical layer address is necessary for judging whether the transfer source of a data packet is a router or a terminal. If a transmission source physical layer address of the data packet is stored in the order table, it is possible to judge that the transfer source is a router and, if the transmission source physical layer address is not stored in the order table, it is possible to judge that the transfer source is a terminal. It is impossible to perform the judgment only with a network address (e.g., an IP address).

Operations of the router in this embodiment will be explained using FIGS. 23 to 25.

Figure 23:
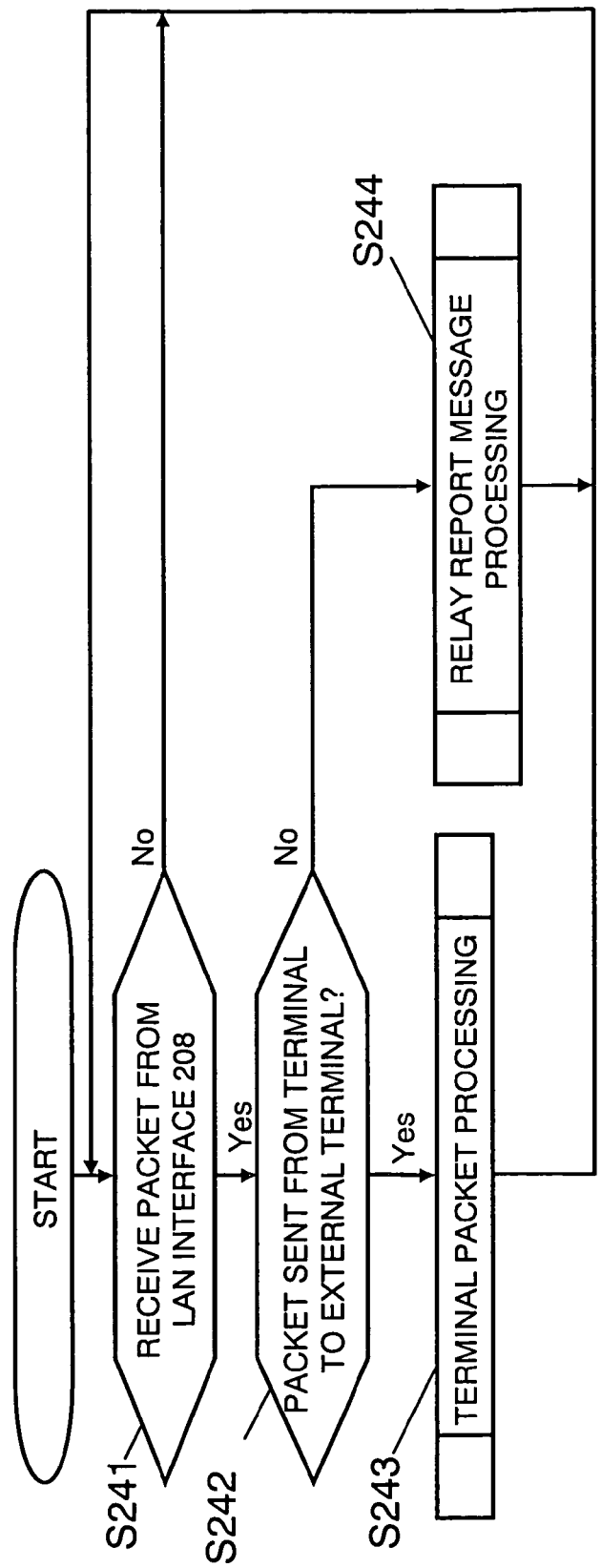
FIG. 23 is a flowchart of packet processing and relay report message processing from a terminal of the router in the third embodiment of the invention.

FIG. 23 is a flowchart for explaining a packet relay operation.

When the packet relaying unit 206 receives a packet from the LAN interface 208 (step S241), if the packet is a packet from a terminal to an external terminal (step S242), the packet relaying unit 206 performs terminal packet processing (step S243). If the packet is not a packet from a terminal to an external terminal (step S242), the packet relaying unit 206 executes relay report message processing (step S244).

Note that, when the packet relaying unit 206 receives a packet from the access interface 209, after checking whether the packet destination is a terminal in the LAN 1, the packet relaying unit 206 transmits the packet from the LAN interface 208.

Figure 24:
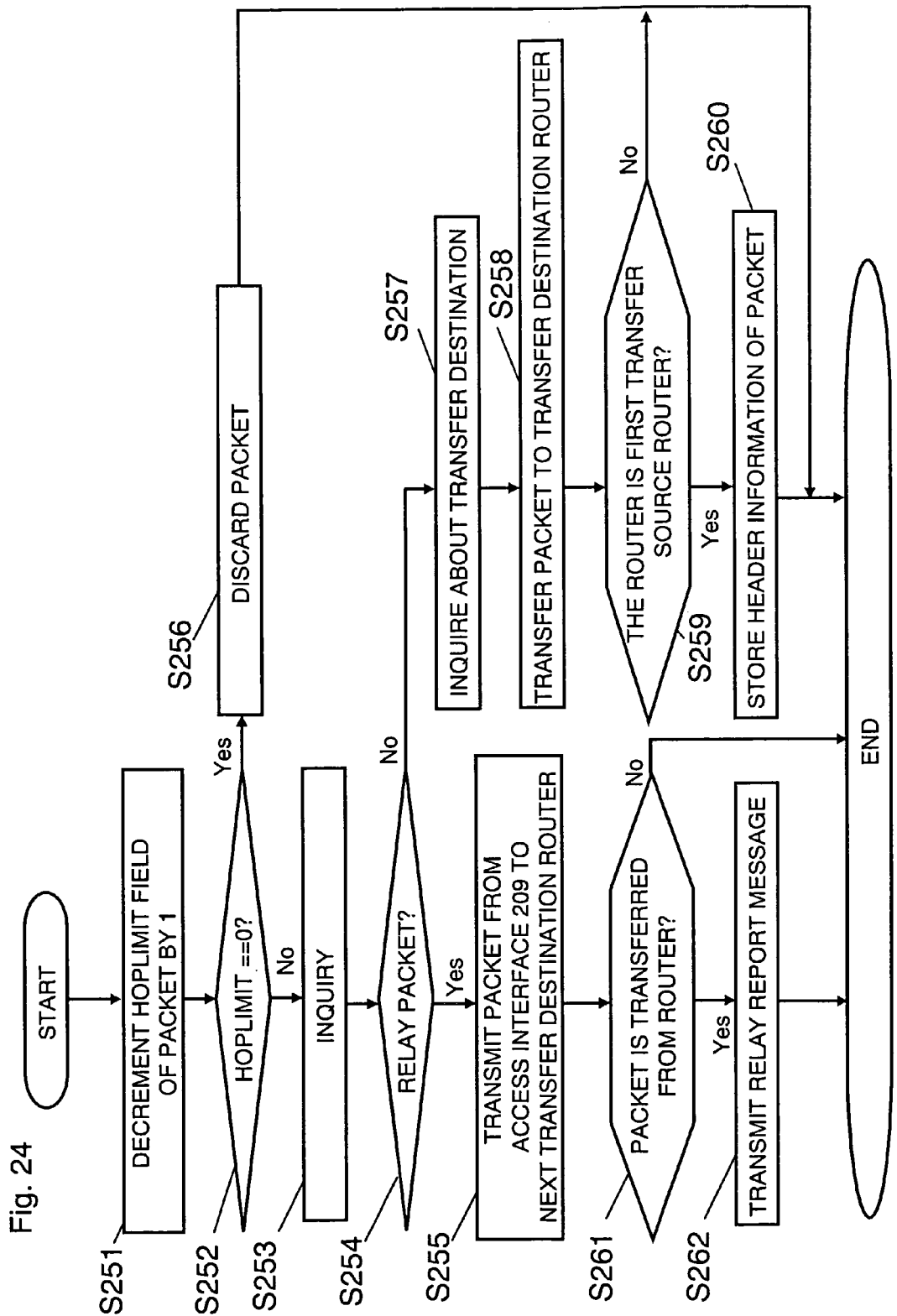
FIG. 24 is a flowchart of packet processing and relay report message processing from the terminal of the router in the third embodiment of the invention.

FIG. 24 is a flowchart showing the terminal packet processing (step S243).

In FIG. 24, steps S251 to S255 are identical with the processing in steps S82 to S87 shown in FIG. 8 in the first embodiment.

In step S255, the packet relaying unit 206 transmits the data packet to the next transfer destination router from the access interface 209. Then, the packet relay unit 206 checks whether the packet transmitted has been transferred from another router (step S261). If the packet has been transferred from another router, the packet relaying unit 206 instructs the relay report constructing unit 213 to generate a relay report message that reports that the router to which the packet relaying unit 206 belongs shall relay the packet. The packet relaying unit 206 transmits the relay report message to the transfer source router which transferred the packet (step S262).

The packet relaying unit 206 can judge whether the packet has been transferred from a router by comparing the transmission source MAC address, the address of the device that sent the packet, and the MAC address of the router which immediately precedes the present router in the router selection order to which the packet relaying unit 206 belongs, described in the order table (FIG. 22). If this MAC address and the transmission source MAC address coincide with each other, the packet relaying unit 206 judges that the packet is transferred from a router. If the transmission source MAC address and the MAC address do not coincide with each other, the packet relaying unit 206 judges that the packet is directly received from a terminal. The destination of the relay report message also is the router immediately preceding the present router in the router selection order.

On the other hand, if in step S254 the packet relaying unit 206 does not relay the packet, the packet relaying unit 206 asks the order determining unit 207 to which router in the same segment the packet should be transferred (step S257). The packet relaying unit 206 transfers the packet to the router designated as the transfer destination (step S258). The processing is identical with steps s88 and S89 shown in FIG. 8 in the first embodiment.

Subsequently, the packet relaying unit 206 checks whether the router to which it belongs is the original router to transfer the packet (step S259). When the router is the first to transfer the packet, the packet relaying unit 206 stores header information of the packet in the header information storage unit 211 (step S260).

The packet relaying unit 206 can judge whether the router to which it belongs is the first to transfer the packet by comparing the transmission source MAC address of the device that sent the packet and the MAC address of the router immediately preceding the present router in the order table (FIG. 22). If this MAC address and the transmission source MAC address do not coincide with each other, the packet relaying unit 206 judges that its router is the first to transfer the packet. If the transmission source MAC address and the MAC address preceding the present one in the order table coincide with each other, the packet relaying unit 206 judges that the router is not the first to transfer the packet.

Figure 25:
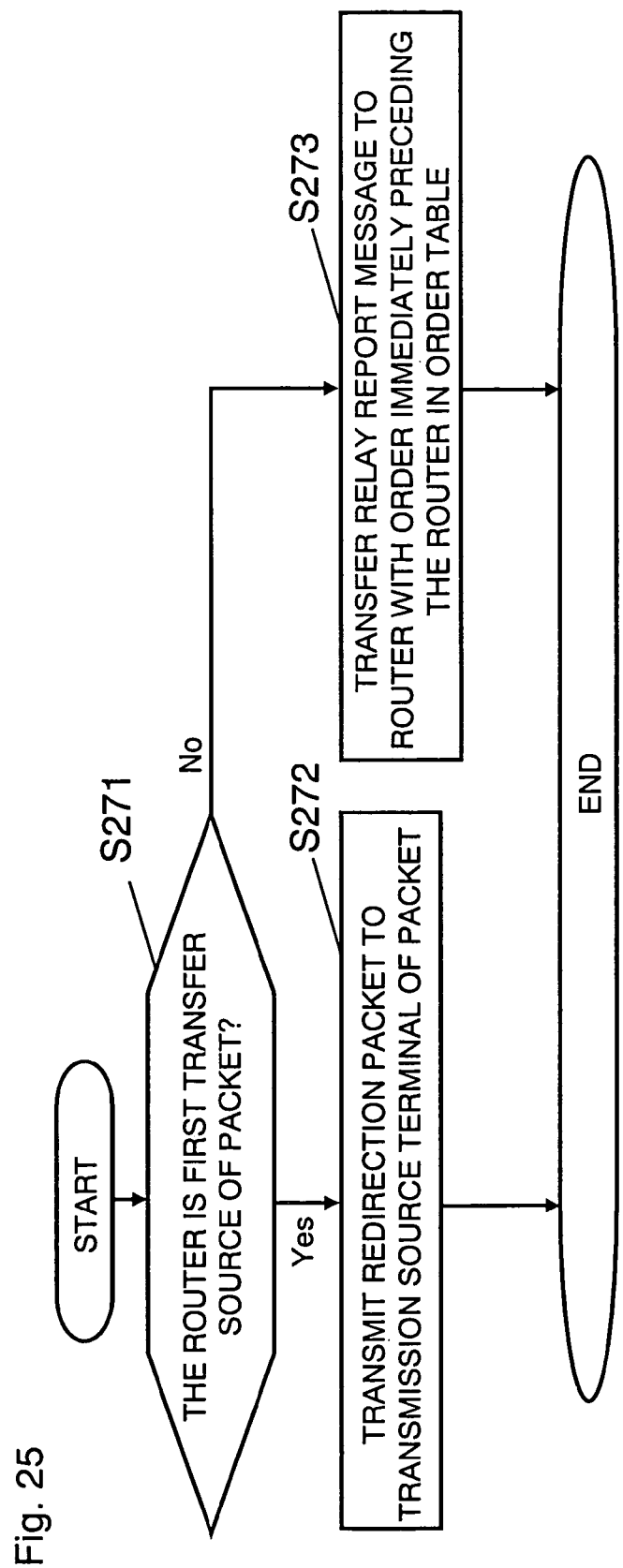
FIG. 25 is a flowchart of packet processing and relay report message processing from the terminal of the router in the third embodiment of the invention.

FIG. 25 is a flowchart showing the relay report message processing (step S244).

In FIG. 25, when the received packet is a relay report message, the packet relaying unit 206 checks whether there is packet header information stored in the header information storage unit 211 which coincides with the packet header information 284 of the data packet included in the message in (step S271). If there is such packet header information in the header information storage unit 211, the packet relaying unit 206 judges that the router to which it belongs is the first to transfer the packet. The packet relaying unit 206 transmits a redirect packet, which designates the router described in the relay router information 283 as the relay router, to the transmission source terminal described in the packet header information 284 (step S272).

On the other hand, if there is no packet header information in the header information storage unit 211 coinciding with the packet header information 284, the packet relaying unit 206 judges that the router to which it belongs is not the first to transfer the packet. The packet relaying unit 206 transfers a relay report message to the router immediately preceding the present router in the order table (step S273).

Operation when a data packet is to be transmitted from a terminal to an external terminal by the router constituted as described above will now be explained.

Figure 26:
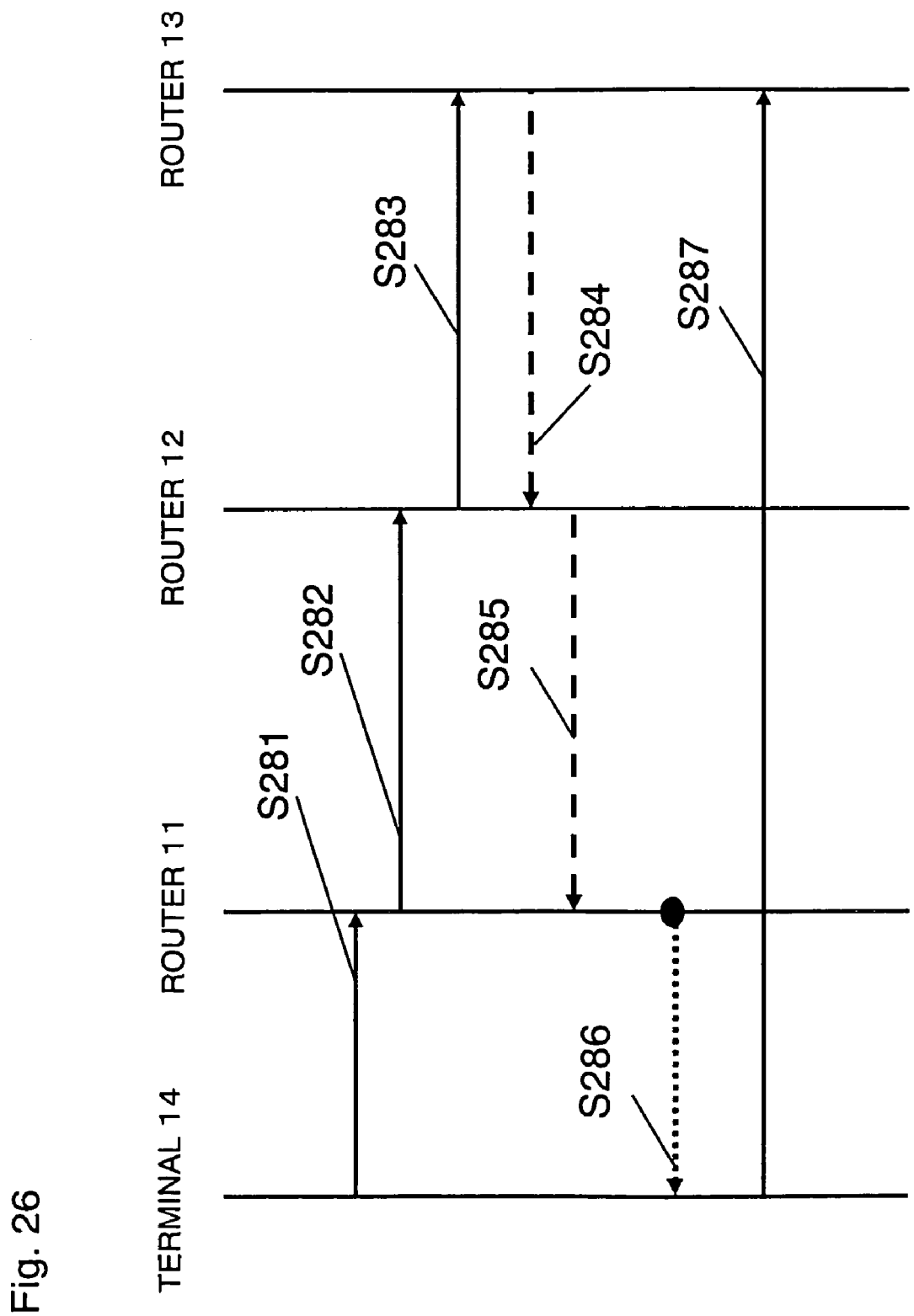
FIG. 26 is a diagram showing a transmission sequence for a data packet and a redirect packet in the third embodiment of the invention.

FIG. 26 is a diagram showing a transmission sequence for a data packet and a redirect packet. In FIG. 26, arrows of solid lines indicate transmission of a data packet, an arrow of a dotted line indicate transmission of a redirect packet, arrows of broken lines indicate transmission of a relay report message, and a circle indicates the transmission source of a redirect packet.

In FIG. 26, the terminal 14 transmits a data packet to the router 11 serving as the default gateway in order to communicate with the external terminal 16 (step S281). When the router 11 receives the data packet, the router 11 determines not to relay the data packet and transfers the packet to the router 12 which is the transfer destination (step S282). At this point, since the packet transferred is the packet directly received from the terminal 14, the router 11 stores header information of the packet.

The router 12 to which the packet has been transferred from the router 11 transfers the packet in the same manner as the router 11 (step S283). At this point, since the router 12 recognizes that a transmission source MAC address of the device which sent the packet is the MAC address of the router 11, the router 12 does not store the header information.

This time, the router 13 to which the packet has been transferred from the router 12 determines that it shall relay the packet and relays the packet. At this point, the router 13 recognizes from the transmission source MAC address of the device that sent the packet that has been relayed and from the order table that the relayed packet is a packet transferred from the router 12. Then, the router 13 transmits a relay report message (FIG. 27A) to the router 12 (step S284).

The router 12, which has received the relay report message, checks whether header information included in the message coincides with header information the router has stored. Since the header information included in the message does not coincide with the stored header information, the router 12 transfers the relay report message (FIG. 27B) to the router 11 (step S285).

The router 11 which has received the relay report message transferred from the router 12 checks whether information included in the message coincides with its stored information. Since the information included in the message coincides with its stored information, the router 11 judges that it is the original router to transfer the packet. Then, the router 13 creates a redirect packet which designates the router 13 as the relay router from relay router information included in the relay report message and transmits the redirect packet to the terminal 14 (step S286).

The terminal 14 which has received the redirect packet changes the relay router for data packets from the router 11 to the router 13 and continues the communication (step S287).

As described above, according to the invention, when a router does not relay a packet to an external network though it is requested to do so, and instead transfers the packet to another router, the router does not transmit a redirection message to the terminal which is the transmission source of the packet. When the router which shall relay the packet is determined, a relay report message is transmitted to the router which first transferred the packet. When the router which first transferred the object packet receives the relay report message, the router transmits a redirect packet which indicates the relay router to the transmission source terminal which sent the packet. Consequently, the redirect packet is transmitted to the transmission source terminal only once. Thus, it is possible to reduce the number of packets flowing in the LAN and reduce load on the network.

Since the transmission source terminal only has to change the relay destination router once, it is possible to reduce the load of transmission processing.

INDUSTRIAL APPLICABILITY

The router selecting method according to the invention is useful for transfer within a network in which a suitable router is selected according to the demands of the application or the like. It is possible to apply this router selecting method to QoS control for communication. It is also possible to apply the router selecting method to applications such as dispersing load among routers.

The invention claimed is:

1. A router selecting method in a local area network (LAN) which includes plural routers, at least one of the plural routers performs relaying with an external network, the router selecting method comprising:
    a step of periodically multicasting, by each of the routers in a common segment of the local area network, a multicast packet including an identifier of the respective one of the routers;
    a router selecting step of selecting, by, a destination to forward a data packet among other routers in the common segment, based on information included in the multicast packets received from the other routers in the common segment;
    a step of determining, by each of the routers, in accordance with conditions determined in advance whether to relay the data packet, received from a node or a one of the routers in the common segment, to another segment;
    a forwarding step of, if the one of the routers which has received the data packet does not relay the data packet to the other segment, performing, by the one of the routers, a redirection by: (1) specifying the selected one of the routers as the relay destination to a source node or router which originally sent the data packet and (2) one of: (i) forwarding the data packet to the specified one of the routers or (ii) discarding the data packet and (3) transmitting a redirection packet to the source node; and
    a step of transmitting, by the source node which has received the redirection packet, the data packet and subsequent data packets to the specified one of the routers based on information in the redirection packet,
    wherein the forwarding step is repeated until the data packet is received by the one of the routers which performs relaying of the data packet to the other segment or to the external network.

2. A router selecting method in a local area network (LAN) including plural routers, at least one of the plural routers performs relaying with an external network, the router selecting method comprising:
    a step of periodically multicasting, by each of the routers in a common segment, a multicast packet including an identifier of the respective router;
    a step of selecting, by a respective router, a destination to forward a data packet among other routers in the common segment, based on information included in the multicast packets received from the other routers in the common segment;
    a step of determining, by each of the routers, in accordance with conditions determined in advance whether to relay the data packet, received from a node or a router in the common segment, to another segment;
    a step of transferring by the router, when the router determines not to relay the received data packet to another segment, the data packet to the selected router;
    a step of transmitting by the router, when the router relays the received data packet to another segment, if the data packet is not directly received from a source node which is the source of the received data packet but is a forwarded packet which is forwarded from another router, information of a reporting relay indicating that the router is capable of relaying the forwarded packet, to a forwarding router which forwarded the packet; and
    a step of judging by the forwarding router, when the forwarding router receives the information of the reporting relay, whether the forwarding router is the original router that has forwarded the data packet specified in the information of the reporting relay, and, if the forwarding router is the original router that has forwarded the data packet, transmitting by the router, a redirection message which specifies that the router is capable of relaying a data packet to the source node which sent the data packet and, if the forwarding router is not the original router that has forwarded the data packet specified in the information of the reporting relay, transferring the information of the reporting relay to a previous router that forwarded the data packet.

3. A router selecting method according to claim 1, wherein the information described in the multicast packet of each of the routers is the identifier of that respective router.

4. A router selecting method according to claim 1, wherein an order of selecting the respective router in the router selecting step is determined by using only the multicast packets including a flag to indicate that the multicast packet is for selecting a router.

5. A router selecting method according to claim 1, wherein an order for selection of the respective router is updated according to an addition of routers in the common segment or a removal of routers from the common segment.

6. A router selecting method according to claim 5, the step of periodically multicasting includes, when a respective multicast packet is received from a router from which a packet has not ever been received, the router is appended to the order as a router added to the common segment.

7. A router selecting method according to claim 6, further comprising: deleting from the order a specific router as a router removed from the LAN, when a respective multicast packet from the specific router is not transmitted for a predetermined time.

8. A router comprising:
a multicast packet transmitting unit that periodically multicasts a multicast packet including an identifier of the router;
a relay determining unit that determines in accordance with a condition specified in advance whether to relay a data packet received from a node or a router in a common segment for being relayed to a router in another segment;
a receiving unit for receiving the data packet received from the node or the router;
an order determining unit that selects a router to forward the data packet among the other routers in the common segment, based on information included in the multicast packets received from the other routers in the common segment; and
a packet relaying unit that performs a redirection by (1) one of: (i) discarding the data packet or (ii) forwarding the data packet to the router selected by the order determining unit, (2) notifying a source by transmitting a redirection packer to the source of the data packet regarding the selected router as a router responsible of relaying data packets when the packet relaying unit receives a notification that the data packet is determined not to be relayed from the relay determining unit.

9. A router comprising:
a multicast packet transmitting unit that periodically multicasts a multicast packet including an identifier of the router;
a relay determining unit that determines in accordance with a condition specified in advance whether to relay a data packet received from a node or a router in a common segment for being relayed to a router in another segment;
an order determining unit that determines the router to forward the data packet among the other routers in the common segment based on information included in the multicast packets received from the other routers in the common segment;
a packet relaying unit that transfers the data packet to the router selected by the order determining unit in response to a notice that the relay determining unit has not relayed the data packet from the relay determining unit and, if the source of the data packet is a node, stores at least a packet identifier, which identifies the data packet, and a device identifier, which identifies the source of the data packet, and binds the two identifiers in a header information storage unit;
a relay report constructing unit that constructs a relay report message, which reports that it decides to relay the data packet, according to a request from the packet relaying unit; and
a relay report transferring unit that transfers the relay report message received from the other router to the router from which the data packet is forwarded,
wherein when the data packet indicated in the relay report message received from another router is the same as the data packet already stored in the header information storage unit, the router notifies the source node identified by the device identifier of the router which decides to relay the data packet.

10. A router according to claim 8, wherein the order determining unit determines an order for selection of routers using the identifiers included in the multicast packet.

11. A router according to claim 10, wherein the order determining unit determines the order for selection of the routers also using flag information included in the multicast packet.

12. A router according to claim 11, the order determining unit has an order updating unit that adds a router to the selection order when a multicast packet is received from a router not included in the selection order and, when a multicast packet is not received from a router included in the selection order during a predetermined time, deletes the router from the selection order.

13. A router according to claim 8, wherein the condition is a type of the data packet, a congestion state in the router, a transmission capability, a number of times the relay determining unit has determined not to relay the data packet, a communication cost, or a combination thereof.

14. A router selecting method according to claim 2, the information described in the multicast packet of each of the routers is the identifier of that respective router.

15. A router selecting method according to claim 14, wherein an order of selecting routers in the router selecting step is determined by using only the multicast packets including a flag to indicate that the respective packet is for selecting a router.

16. A router selecting method according to claim 2, wherein an order for selection of routers is updated according to an addition of the routers in the common segment or a removal of routers from the common segment.

17. A router selecting method according to claim 16, wherein the multicast packet is periodically transmitted from each of the routers and, when a multicast packet is received from a router from which a packet has not been received, the router is appended to the order as a router added to the common segment.

18. A router selecting method according to claim 17, wherein, when a multicast packet from a specific router is not transmitted for a predetermined time, the specific router is deleted from the order as a router removed from the LAN.

19. A router according to claim 9, wherein the order determining unit determines an order for selection of routers using identifiers included in the multicast packet.

20. A router comprising:
a multicast packet transmitting unit that periodically multicasts a multicast packet including an identifier of the router;
a relay determining unit that determines in accordance with a condition specified in advance whether to relay a data packet received from a node or a router in a common segment for being relayed to a router in another segment;
an order determining unit that selects a router to forward the data packet among the other routers in the common segment, based on information included in the multicast packets received from the other routers in the common segment; and
a packet relaying unit that discards or forwards the data packet to the router selected by the order determining unit and notifies a source of the data packet of the selected router as a router responsible of relaying data packets when the packet relaying unit receives a notification that the data packet is determined not to be relayed from the relay determining unit;
wherein the order determining unit determines an order for selection of routers using the identifiers included in the multicast packet and also using flag information included in the multicast packet.

21. A router according to claim 19, wherein the order determining unit has an order updating unit that adds a router to the selection order when a multicast packet is received from the router not included in the selection order and, when a multicast packet is not received from the router included in the selection order during a predetermined time, deletes the router from the selection order.

22. A router according to claim 9, wherein the condition is a type of the data packet, a congestion state in the router, a transmission capability, a number of times the relay determining unit has determined not to relay the data packet, a communication cost, or a combination thereof.

* * * * *

UNITED STATES PATENT AND TRADEMARK OFFICE
CERTIFICATE OF CORRECTION

| | |
|---|---|
| PATENT NO. | : 7,499,396 B2 |
| APPLICATION NO. | : 10/554717 |
| DATED | : March 3, 2009 |
| INVENTOR(S) | : Masayuki Kumazawa et al. |

It is certified that error appears in the above-identified patent and that said Letters Patent is hereby corrected as shown below:

In claim 21 of the Letters Patent at Column 24, line 13, "from the router" should read --from a router--

Signed and Sealed this

Fourth Day of August, 2009

JOHN DOLL
*Acting Director of the United States Patent and Trademark Office*